(12) United States Patent
Hausmann et al.

(10) Patent No.: US 9,008,409 B2
(45) Date of Patent: Apr. 14, 2015

(54) METHOD AND SYSTEM FOR DIGITAL IMAGE ANALYSIS OF EAR TRAITS

(71) Applicant: Pioneer Hi-Bred International, Inc., Johnston, IA (US)

(72) Inventors: Neil Jonathan Hausmann, Davis, CA (US); Tabare E. Abadie, Johnston, IA (US); Mark Cooper, Johnston, IA (US); Honor Renee LaFitte, Davis, CA (US); Jeffrey R. Schussler, Marion, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 0 days.

(21) Appl. No.: 13/908,683

(22) Filed: Jun. 3, 2013

(65) Prior Publication Data
US 2013/0266191 A1 Oct. 10, 2013

Related U.S. Application Data

(63) Continuation of application No. 13/192,291, filed on Jul. 27, 2011, now Pat. No. 8,488,865, which is a continuation of application No. 11/891,776, filed on Aug. 13, 2007, now Pat. No. 8,073,235.

(51) Int. Cl.
*G06K 9/00* (2006.01)
*G06T 7/00* (2006.01)

(52) U.S. Cl.
CPC .............. *G06T 7/0002* (2013.01); *G06T 7/0012* (2013.01); *G06T 2207/30004* (2013.01)

(58) Field of Classification Search
CPC ................... G06T 7/0012; G06T 2207/30004; G06T 7/0002
USPC ......................................................... 382/141
See application file for complete search history.

(56) References Cited

U.S. PATENT DOCUMENTS

| | | | |
|---|---|---|---|
| 5,518,454 A | 5/1996 | Twilley et al. | |
| 5,659,623 A | 8/1997 | Conrad | |
| 5,764,819 A | 6/1998 | Orr et al. | |
| 5,835,206 A * | 11/1998 | Tragesser | 356/72 |
| 6,212,824 B1 | 4/2001 | Orr et al. | |
| 6,418,180 B1 | 7/2002 | Weiss | |
| 6,567,537 B1 | 5/2003 | Anderson | |
| 7,123,750 B2 | 10/2006 | Lu et al. | |
| 7,998,669 B2 | 8/2011 | Deppermann et al. | |
| 8,028,469 B2 | 10/2011 | Deppermann et al. | |

(Continued)

FOREIGN PATENT DOCUMENTS

JP 04145309 5/1992

OTHER PUBLICATIONS

PCT/US2008/009433 International Search Report.
(Continued)

*Primary Examiner* — Tom Y Lu
(74) *Attorney, Agent, or Firm* — Pioneer Hi-Bred Int'l.

(57) ABSTRACT

A method of evaluating one or more kernels of an ear of maize using digital imagery includes acquiring a digital image of the one or more kernels of the ear of maize, processing the digital image to estimate at least one physical property of the one or more kernels of the ear of maize from the digital image, and evaluating the at least one kernel of maize using the estimate of the at least one physical property of the at least one kernel of maize.

17 Claims, 45 Drawing Sheets
(24 of 45 Drawing Sheet(s) Filed in Color)

(56) References Cited

U.S. PATENT DOCUMENTS

| | | |
|---|---|---|
| 8,189,901 B2 | 5/2012 | Modiano et al. |
| 8,245,439 B2 | 8/2012 | Deppermann et al. |
| 2003/0072484 A1 | 4/2003 | Kokko et al. |
| 2003/0142852 A1 | 7/2003 | Lu et al. |
| 2005/0074146 A1 | 4/2005 | Jones et al. |
| 2006/0068372 A1 | 3/2006 | Jones, III |
| 2012/0228199 A1 | 9/2012 | Modiano et al. |
| 2012/0288854 A1 | 11/2012 | Deppermann et al. |

OTHER PUBLICATIONS

Jia, J., "Seed maize quality inspection with machine vision", SPIE—Computer Vision for Industry, vol. 2989 (288-295), 1993. Abstract XP002507235.

Pesaresi, Martino et al., "A New Approach for the Morphological Segmentation of High-Resolution Satellite Imagery", IEEE Transactions on Geosciences and Remote Sensing, IEE Service Center, Piscataway, NJ, US, vol. 39 (2), Feb. 1, 2001. Abstract XP0011021693, ISSN: 0196-2892.

Shyu, Chi-Ren et al., "Image Analysis for Mapping Immeasurable Phenotypes in Maize [Life Sciences]", IEEE Signal Processing Magazine, IEEE Service Center, NJ, US, vol. 24(3): 115-18 (May 2, 2007). Abstract XP011201392, ISSH: 1053-5888.

U.S. Appl. No. 60/778,830, filed Mar. 2, 2006; first named inventor: Deppermann.

U.S. Appl. No. 60/940,788, filed May 30, 2007; first named inventor: Deppermann.

* cited by examiner

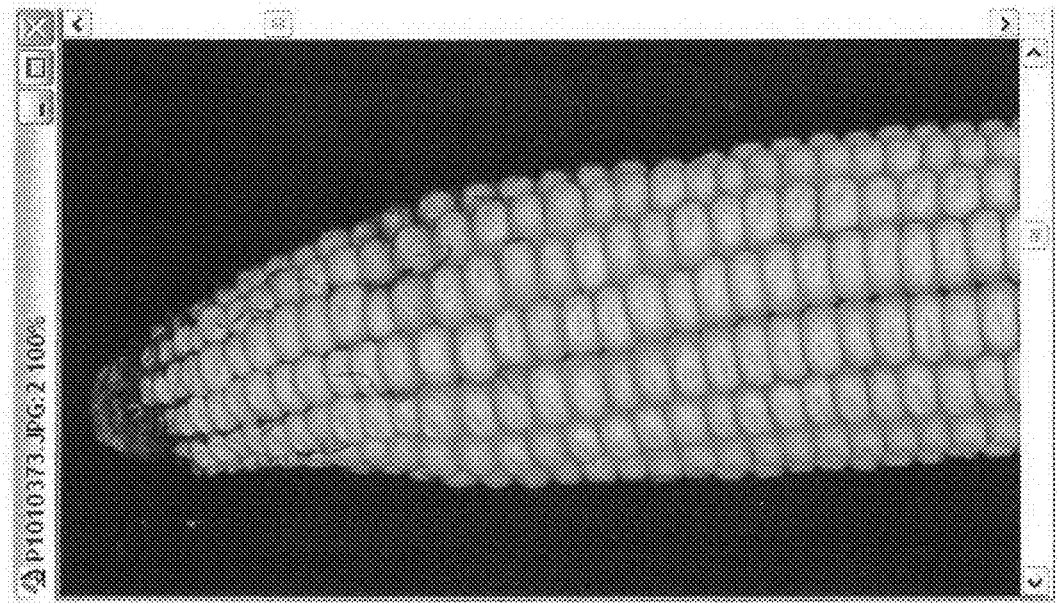
FIG. 24A

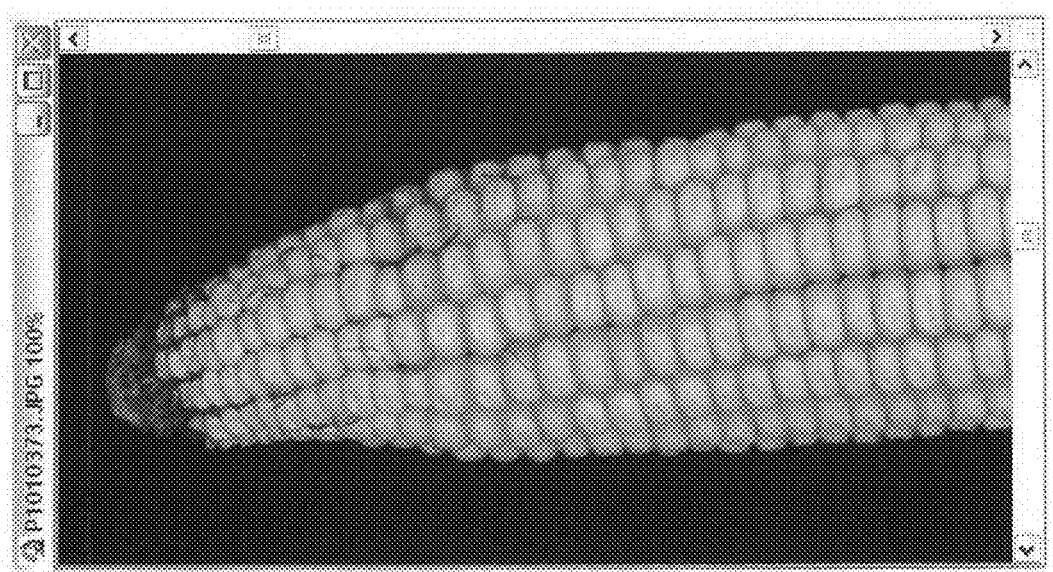
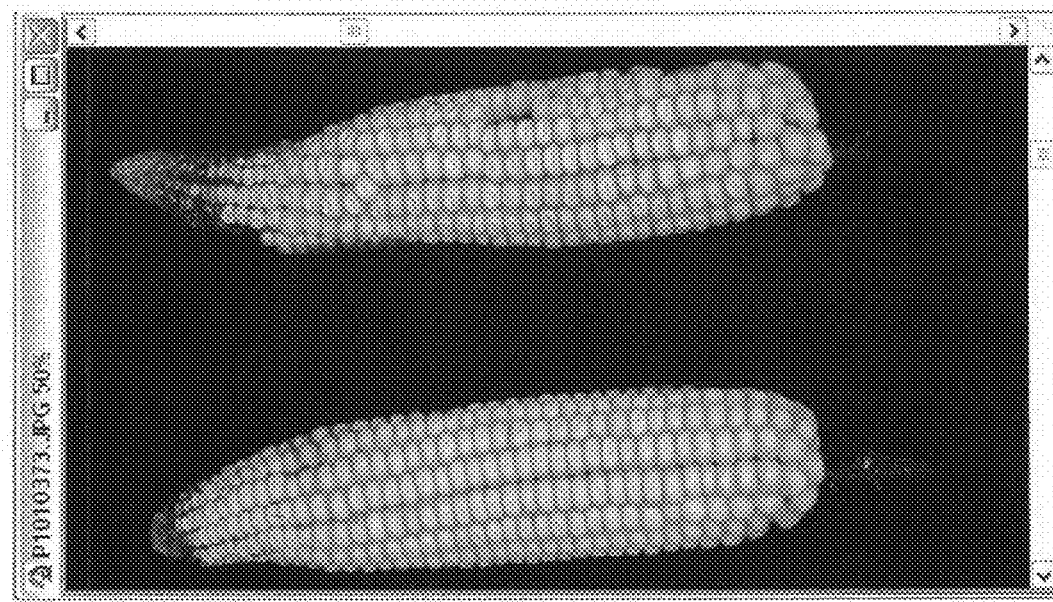
FIG. 24B

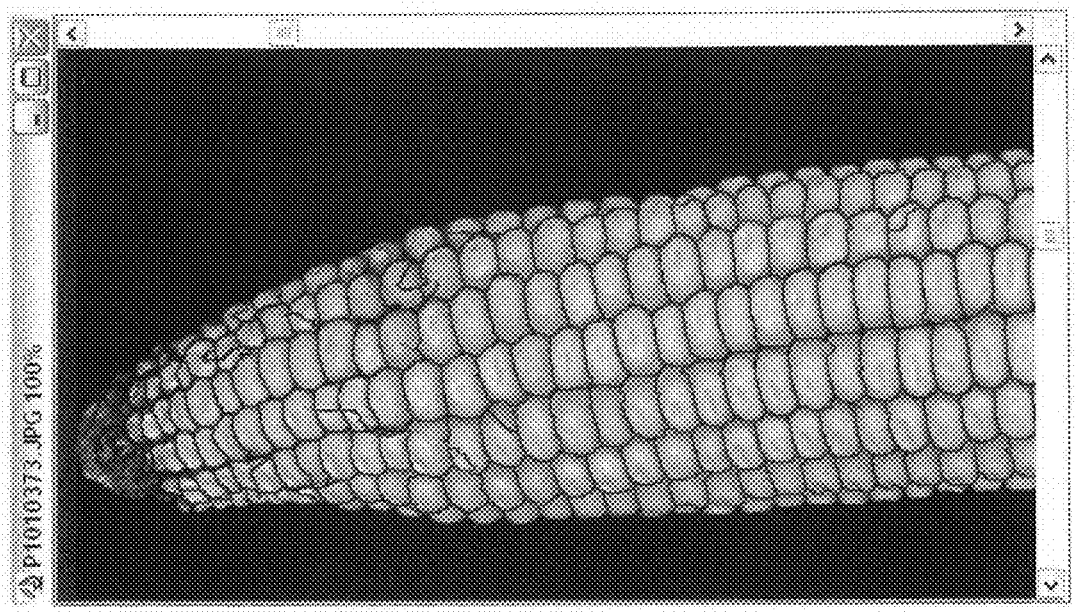
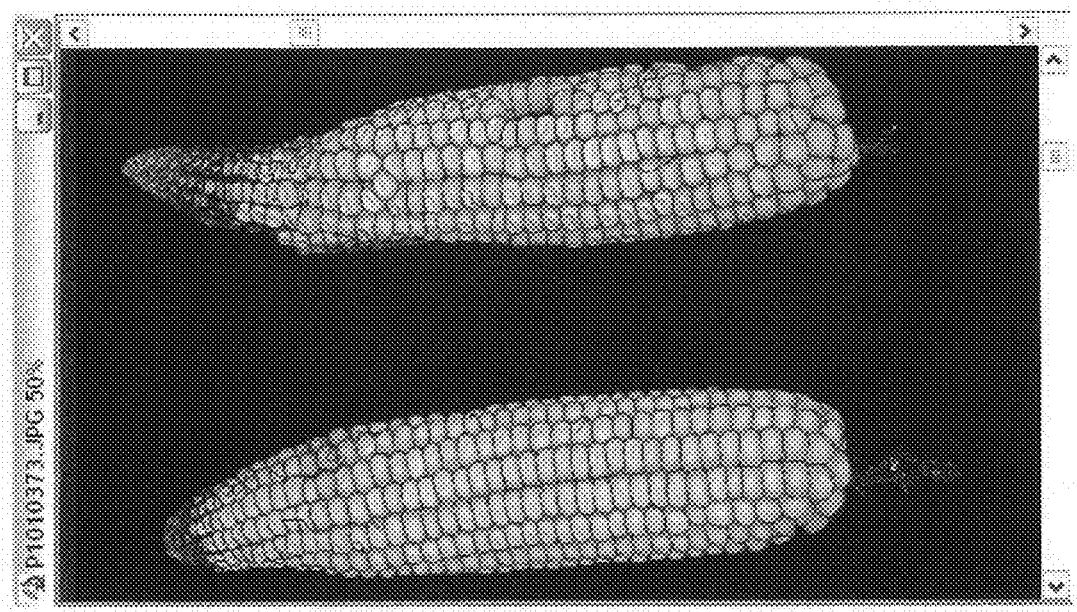
FIG. 24D

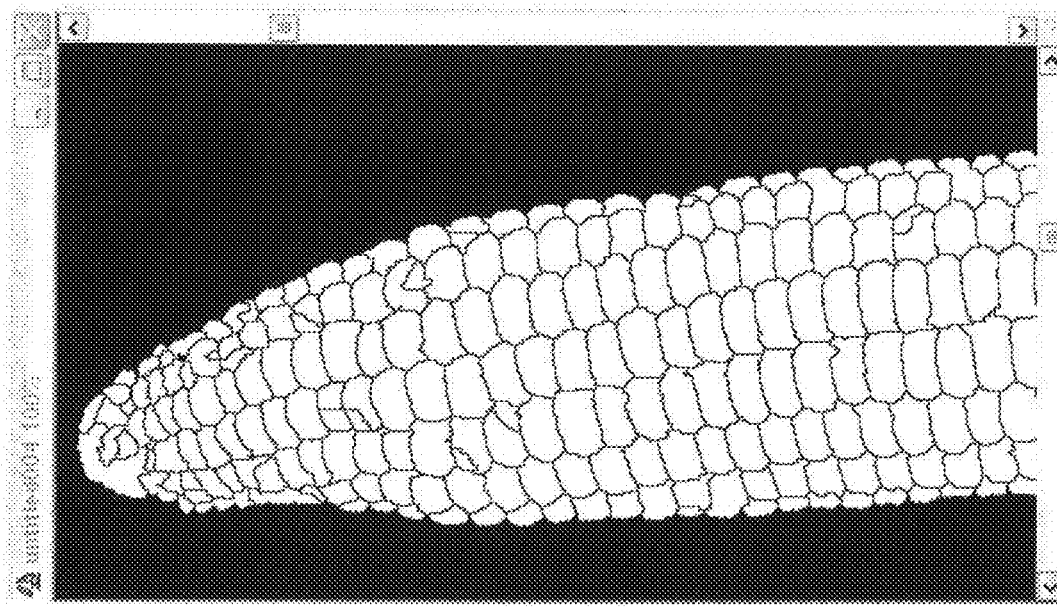
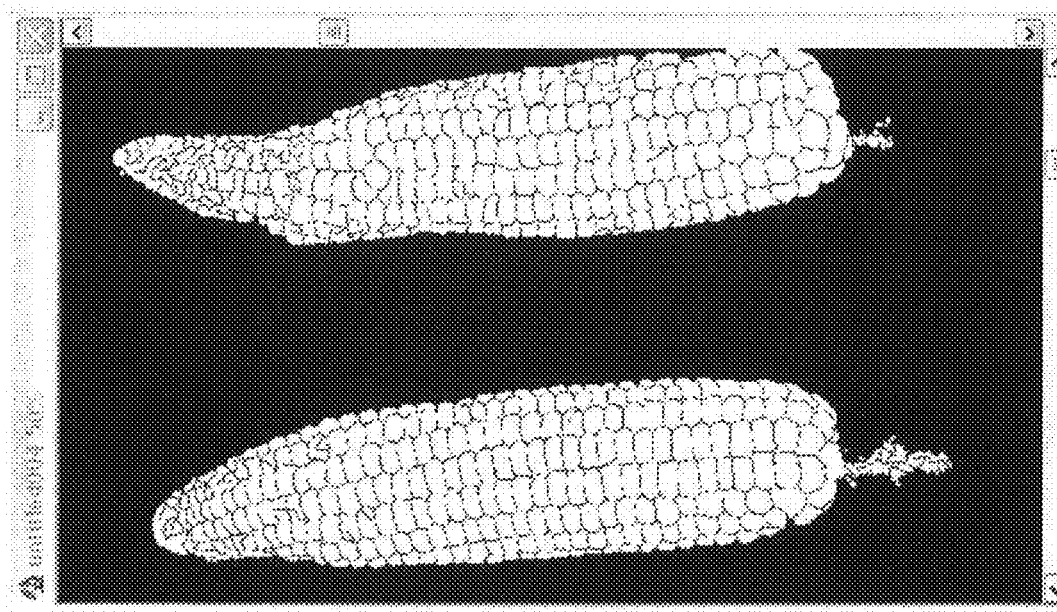
FIG. 24E

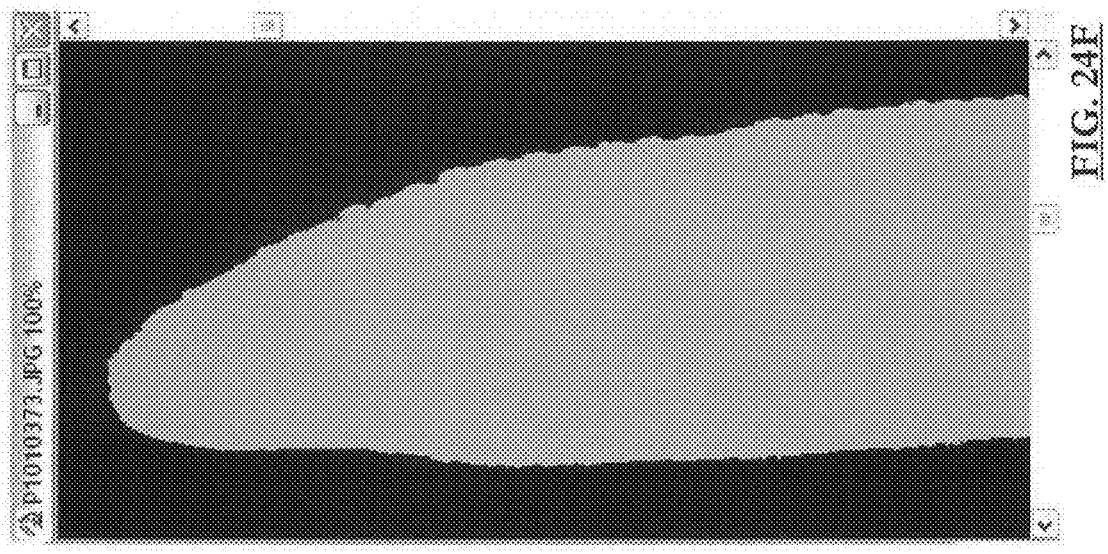
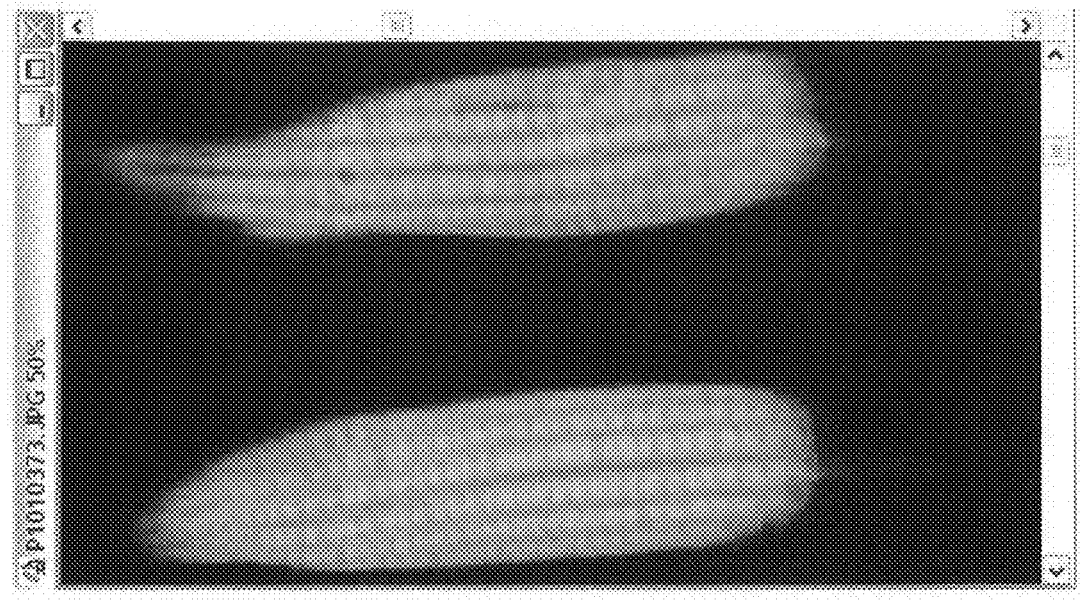
FIG. 24F

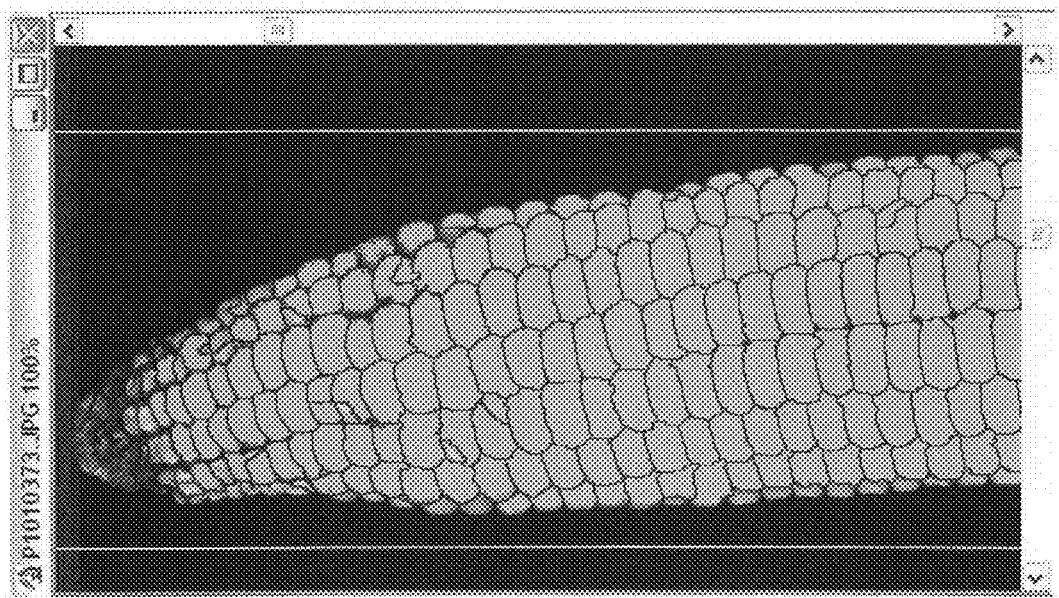
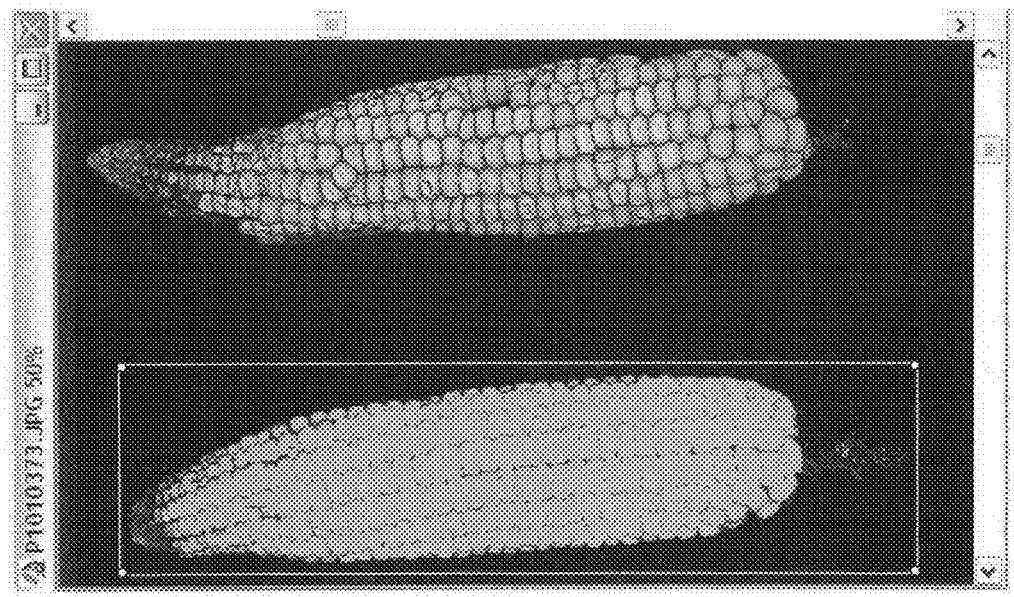
FIG. 24H

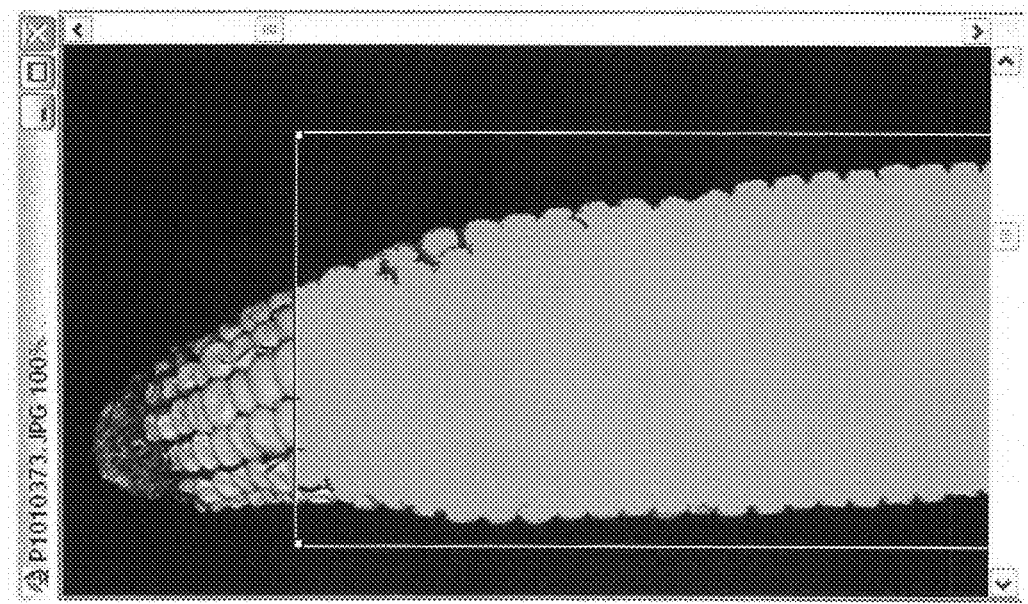
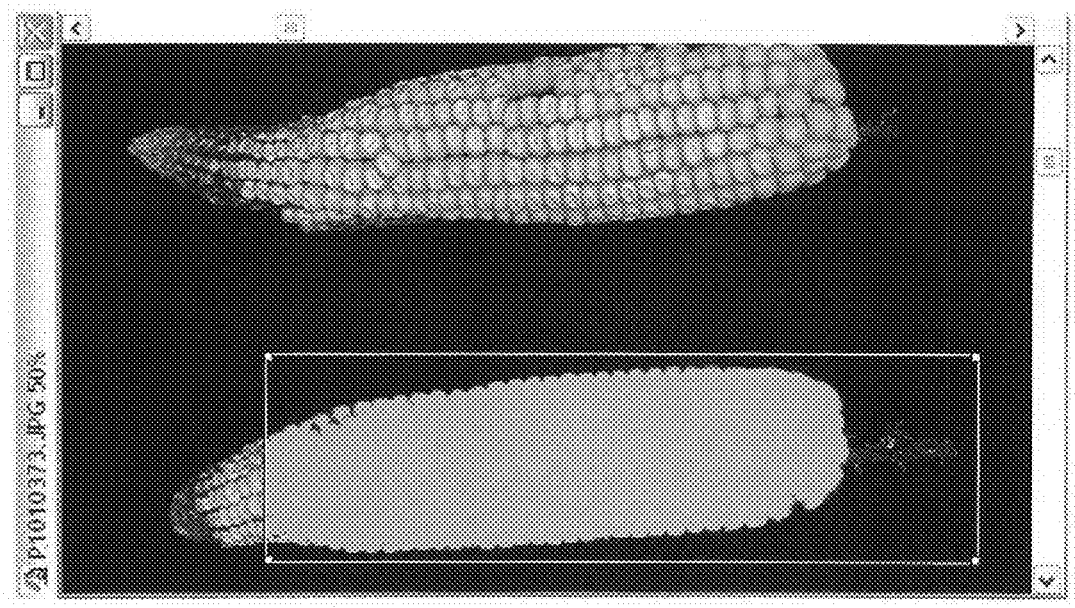
FIG. 24K

METHOD AND SYSTEM FOR DIGITAL IMAGE ANALYSIS OF EAR TRAITS

CROSS-REFERENCE TO RELATED APPLICATIONS

This application is a Continuation of U.S. patent application Ser. No. 13/192,291, filed Jul. 27, 2011, which is a Continuation of U.S. application Ser. No. 11/891,776, filed Aug. 13, 2007, each of which is hereby incorporated by reference in its entirety.

BACKGROUND OF THE INVENTION

Breeder knowledge and published information suggests that yield stability of genotypes over varying environments may be positively associated with greater yield stability within plots. Current combine harvester technology provides a plot average yield and does not allow quantification of differences between plants within the plot. Previous to this invention, within plot stability could be qualitatively assessed by plant breeders using visual methods. This subjective method is difficult to standardize and depends on breeder knowledge and training. Alternatively, ears could be hand harvested, individually shelled, weighed and kernels could be counted. This manual method is so labor intensive as to make it prohibitive for experiments involving large breeding populations. Improved methods and systems are needed.

BRIEF SUMMARY OF THE INVENTION

A method of evaluating one or more kernels of an ear of maize using digital imagery includes acquiring a digital image of the one or more kernels of the ear of maize, processing the digital image to estimate at least one physical property of the one or more kernels of the ear of maize from the digital image, and evaluating the at least one kernel of maize using the estimate of the at least one physical property of the at least one kernel of maize.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 24A-24L illustrate one example of a process.

DETAILED DESCRIPTION OF THE PREFERRED EMBODIMENT

This invention was designed to quantify kernel and ear traits in a high throughput manner with little degradation of data quality. This technique has already provided insight through the measurement of the proportion of repressed plants within a plot. This trait is already being used to screen breeding populations for stress tolerance. This technique also allows for the direct estimation of various traits, such as, kernel abortion, kernel set, yield, kernel numbers per ear, within-ear carbon partitioning and screening of populations for disease tolerance from these same images. Moreover, measures of within plot variation for the traits listed above are easily produced. To increase throughput, ear and image collection could also be automated (e.g. incorporated into a picker-sheller combine).

Digital imaging and appropriate image processing allow for high throughput quantitative measurement of ear component phenotypes of individual maize plants. Such measurements have various uses in plant breeding applications such as, but not limited to, the study of genetic variation on a plant-to-plant basis. Examples of traits that may be determined from imaging include, without limitation, ear color (such as by determining red, blue, and green density), kernel color (such as by determining red, blue, and green density), percent damage resulting from diseases or insects (such as *Fusarium verticilliodes, Diplodia maydis, Ustilago maydis, Agrotis ipsilon, Blissus Leucopterus, Agramyza parvicorreis*), kernel starch content, kernel fill pattern (such as regular, irregular or other characterization), kernel texture, within plot variation of any of the previously listed traits, linear slope of kernel distribution, exponential slope of kernel area distribution, critical kernel ring of kernel area distribution, and count of total kernel rings from kernel area distribution.

Overview

Figure 1:
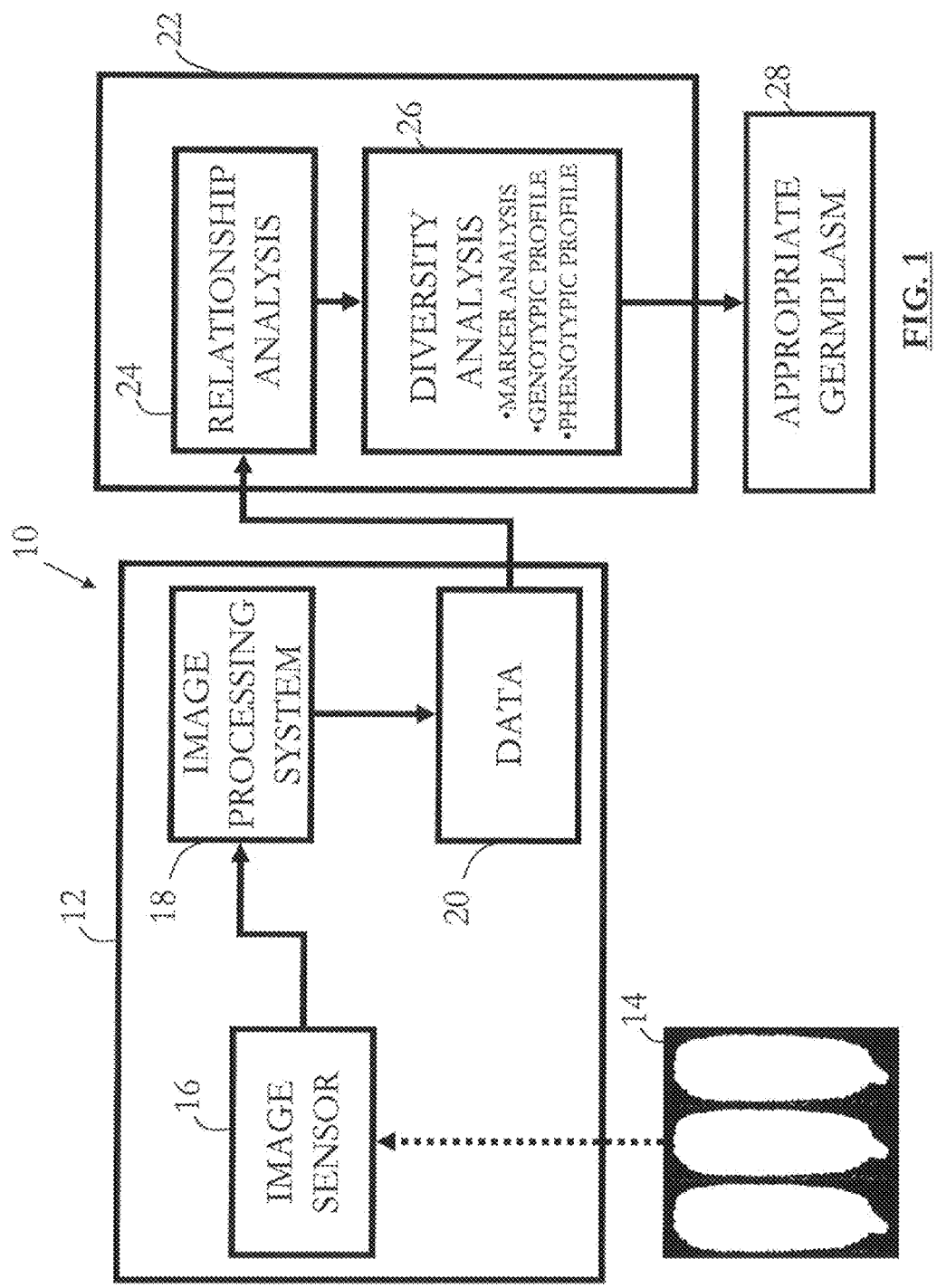
FIG. 1 is a block diagram of a system.

FIG. 1 provides an overview of a system 10. The system 10 has an image acquisition and processing component 12. In FIG. 1, one or more ears of maize 14 are shown. An image sensor 16 is used to collect image data from one or more ears of maize 14. The image sensor 16 may be of any number of types of image sensors 16 as may be associated with cameras or imaging devices. For example, the image sensor 16 may be a CCD camera, color sensor, ultrasonic sensor, or light beam sensor. The image sensor 16 may provide for color imaging, imaging of specific wavelengths of light or imaging across a wide spectrum. After the image sensor 16 is used to acquire an image, an image processing system 18 is used to process one or more images such as by applying one or more image processing algorithms. Examples of types of algorithms include, without limitation, filtering, watershedding, thresholding, edge finding, edge enhancement, color selection and spectral filtering. The image processing system 18 also provides for extracting data 20 from one or more images. The data 20 can include kernel count, kernel size distribution, proportion of kernels aborted and other information.

The data 20 extracted from one or more images is used by an analysis component 22. The analysis component 22 has a relationship analysis component 24. The relationship analysis component 24 relates the data 20 to one or more physically measured properties or characteristics. For example, the relationship analysis component can modify a kernel count from the half ear visible in the image by using a previously established linear regression that relates a kernel count determined by imaging to a kernel count determined by manual counting if doing so will improve kernel count accuracy. The relationship analysis component 24 may also be used to calculate statistics that describe the variation between plants within a plot.

A diversity analysis component 26 is also shown. The diversity analysis component 26 may provide for marker analysis, genotypic profiles, phenotypic profiles, or other types of analysis. Based on the results from the diversity analysis component 26, appropriate germplasm 28 is identified.

Thus, as shown in FIG. 1, data extracted from digital images of ears of maize is used in a manner that elucidates ear traits and interplant and intraear variation of ear traits.

Figure 2:
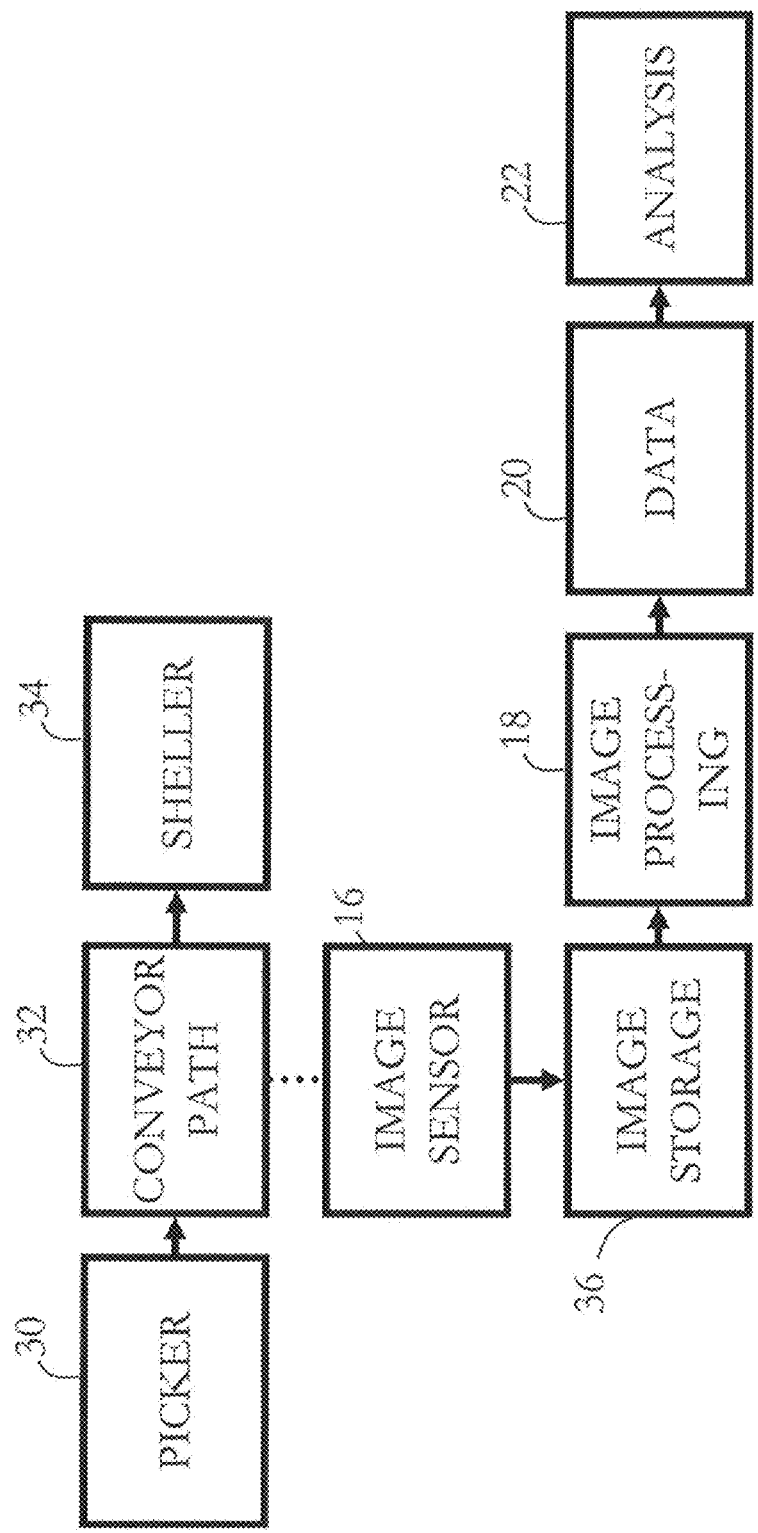
FIG. 2 is a block diagram of a system integrated into a combination picker-sheller.

FIG. 2 illustrates a system integrated with a combination picker sheller. A picker 30 is used to pick ears of maize in the conventional manner. After ears of maize are picked, they are conveyed along a conveyor path 32 to a shelter 34. Any number of forms of conveyance may be used as may be most appropriate for a particular design of combination picker sheller. The conveyor path 32 allows for ears to be imaged prior to the ears being shelled by the sheller 34. The ears are imaged with the image sensor 16. Image storage 36 may be used for storing the image. Using image storage 36 allows for the imaging processing component 18 to be located remotely from the combination picker sheller. For example, the image storage 36 may include digital media such as, but not limited to, solid state, magnetic, or optical memory for storing representations of digital images. The digital media may then be removed from the combination picker sheller and taken to a different site for processing. Alternatively, the image processing component 18 may receive the images wirelessly or the image processing component 18 may be located onboard a combination picker sheller machine, such as a self-powered combination picker sheller. The image processing component 18 then process the images so that data 20 may be extracted. An analysis component 22 then analyzes the data 20.

Acquisition of Images

Ears may be hand or machine harvested at maturity and a digital image may be taken under controlled lighting conditions. The image may be taken of one or more ears of corn or of one of more kernels separated or attached to the ear. As the image analysis (discussed below) may involve the use of spectral filters, the use of controlled lighting conditions allows for simplifying the use of spectral filters and standardizing data capture. Without controlled lighting conditions, determinations of lighting conditions may be made and additional calibrations may be performed to assist in providing proper image processing.

To acquire the image, various types of image sensors may be used. The image sensors used may include a charge coupled device (CCD) image sensor, a camera, video camera, color sensor, laser/light beam sensor, ultrasonic sensor, or other type of image sensor. The image sensor may provide for color imaging as color imaging may be desirable where spectral filters are used. The image sensor may provide for imaging across a spectrum wider than or different from the visible spectrum. The image sensor may be configured to image a single ear, multiple ears, individual kernels or multiple kernels in each frame. If analog images are directly acquired instead of digital images, then the analog images may be converted to digital images through scanning or other means. Alternatively, the amount of light intercepted as the ear moves through a light field could provide an alternate means of either two or three dimensional data collection.

Image Processing and Data Extraction

Data is automatically extracted for each ear from digital images using image processing software. One example of an image processing software application which may be used is Image Pro Plus (MediaCybernetics, Silver Spring, Md.). Various image processing operations may be performed or techniques or algorithms applied as will be discussed in greater detail. Recorded data for each ear may include, without limitation, minor axis length, major axis length, kernel count, ear filled kernel length, ear filled kernel width, ear filled kernel area, ear filled kernel plus cob length, ear filled kernel plus cob width, ear filled kernel plus cob area, ear color, ear roundness, ear color density, kernel area, kernel color (such as red, blue, green density), kernel roundness, filled kernel count, kernel length, kernel width, kernel location in image (x,y coordinates), ear length of filled kernels, ear length of filled plus aborted kernels, ear area of filled plus aborted kernels, ear area of aborted kernels, ear area of filled plus aborted kernels, ear area of aborted kernels, area of damage resulting from *Fusarium verticilliodes, Diplodia maydis, Ustilago maydis, Agrotis ipsilon, Blissus Leucopterus, Agramyza parvicorreis* and/or other diseases and/or insects, or other information regarding size, shape, location, color of an ear, kernel, or portion of an ear or kernel.

Figure 3:
FIG. 3 is a digital image of five separate ears of maize.
Figure 4:
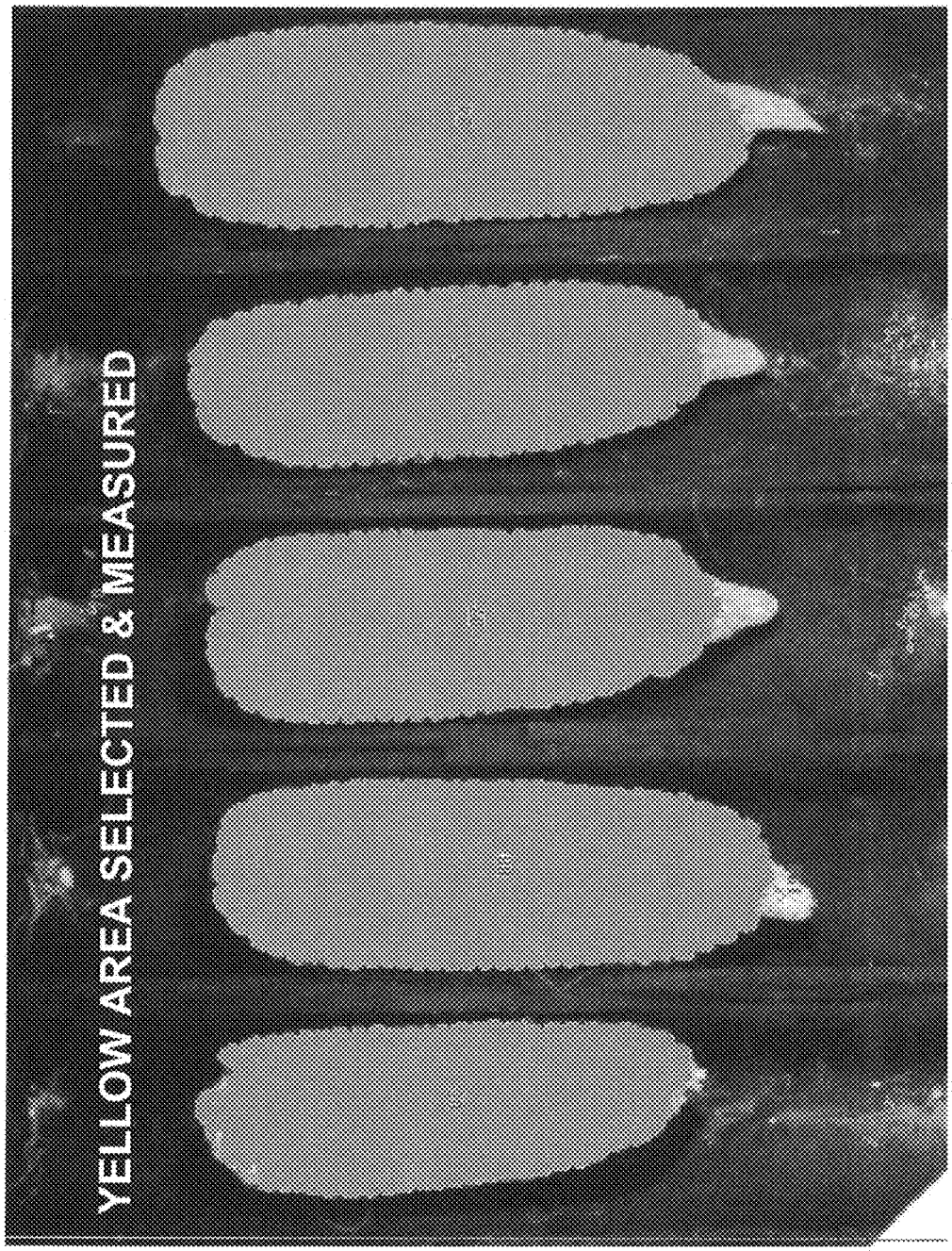
FIG. 4 is a representation of FIG. 4 after the area of filled kernels of each of the ears has been selected.

FIG. 3 is a photograph of a digital image of five separate ears of maize. One image processing technique is to select the filled kernel area for each ear using a predetermined color palette. FIG. 4 is a photograph after the filled kernel area of each of the five separate ears of maize in the digital image have been selected. The filled kernel area has been shown to be closely related to individual ear yield. For the selected region of each ear, a minor axis length, a major axis length, and a filled kernel area may be calculated.

Figure 5:
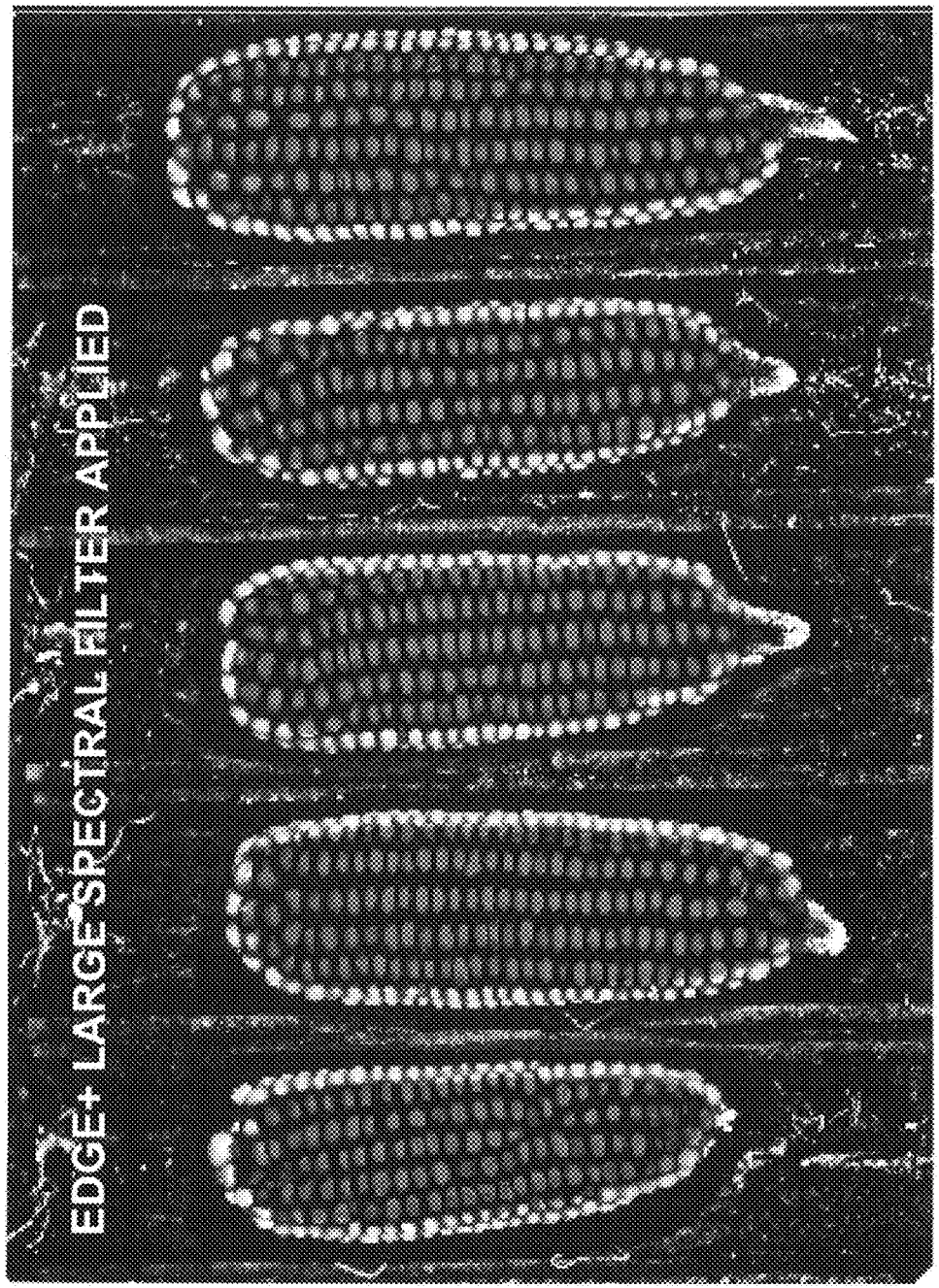
FIG. 5 is a representation of FIG. 4 after an edge filter and a spectral filter have been applied.
Figure 6:
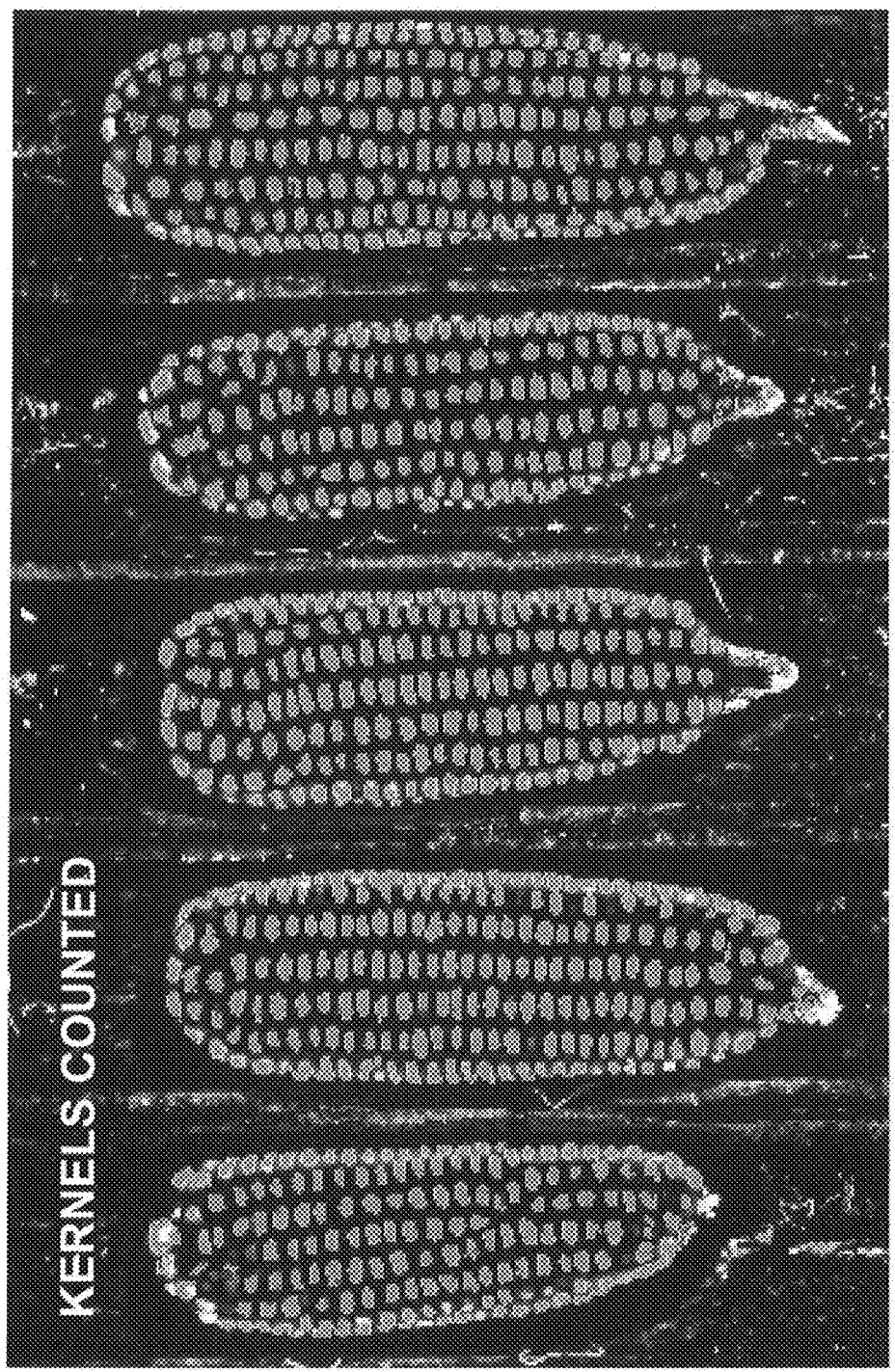
FIG. 6 is a representation of FIG. 4 after a large spectral filter has been applied.

FIG. 5 illustrates that an edge filter and a spectral filter may be applied to the digital image of five separate ears of maize. The use of such filters enhances the digital image for purposes of image segmentation of the kernels of each kernel. As shown in FIG. 5, both the edge kernels shown in yellow have been identified and application of a large spectral filter results in bright regions for each kernel which are separated by black space. In FIG. 5, the edge kernels for each ear have been preserved. Such a filter accentuates the center of the kernels, thereby allowing counting of kernels in the image using a color palette. In FIG. 6, a color palette is chosen thereby allowing kernels to be counted and measured. This count has been shown to be closely related to physical kernel counts for each ear.

Figure 7:
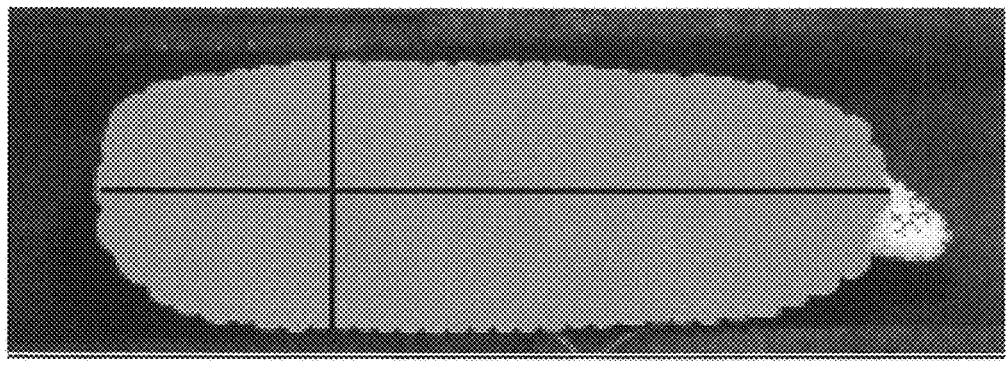
FIG. 7 is an image of an ear of maize showing a major and a minor axis.

FIG. 7 is an image of an ear of maize showing a major axis and a minor axis. Data may be automatically extracted from images in batch mode enabling labor free processing of many images each day. To manually process such numbers of images would be prohibitively expensive and/or time-consuming.

As previously discussed, examples of data which may be extracted include minor axis length, major axis length, the size of the filled kernel area, and kernel count. It is to be appreciated that these items of data or other items of data may relate to various traits of interest in breeding. The following table illustrates examples of such data.

| Ear # | Count | Filled kernel Area | Major axis | Minor axis |
|---|---|---|---|---|
| 1 | 1 | 3.72 | 3.729 | 1.278 |
| 2 | 7 | 2.854 | 3.284 | 1.1 |
| 3 | 5 | 3.114 | 3.248 | 1.218 |
| 4 | 2 | 3.373 | 3.543 | 1.217 |
| 5 | 2 | 2.495 | 3.038 | 1.053 |
| 5 | 149 | 0.915 | 0.4 | 0.163 |
| 4 | 154 | 1.275 | 0.897 | 0.166 |
| 3 | 163 | 1.219 | 0.361 | 0.164 |
| 2 | 144 | 0.986 | 0.26 | 0.117 |
| 1 | 204 | 1.279 | 0.401 | 0.111 |

Data Analysis

The data may be paired with other data so that relationships between the pairs of data may be determined by regression or other statistical techniques used to relate sets of variables. It is to be understood that the type of relationship present between pairs of data may vary and as such different mathematical or statistical tools may be applied. It is to be understood also, that instead of relating two sets of data (pairing), multiple sets of data may be related.

A wide variety of information may be obtained through data analysis. Examples of such information include, without limitation, percent tip kernel abortion, number of kernels aborted, kernel size, percent of loss due to scattergrain, kernels per ear image, kernels per ear, kernel shape, ear shape, ear length, ear width, area of filled kernels, yield, kernel size distribution from base to tip, kernel weight, kernel color, kernel starch content, kernel fill pattern, kernel texture, percent of repressed plants within a plot, percent damage resulting from *Fusarium verticilliodes, Diplodia maydis, Ustilago maydis, Agrotis ipsilon, Blissus Leucopterus, Agramyza parvicorreis* and/or other diseases and/or insects, and within plot variation of any of the above values.

Figure 8:
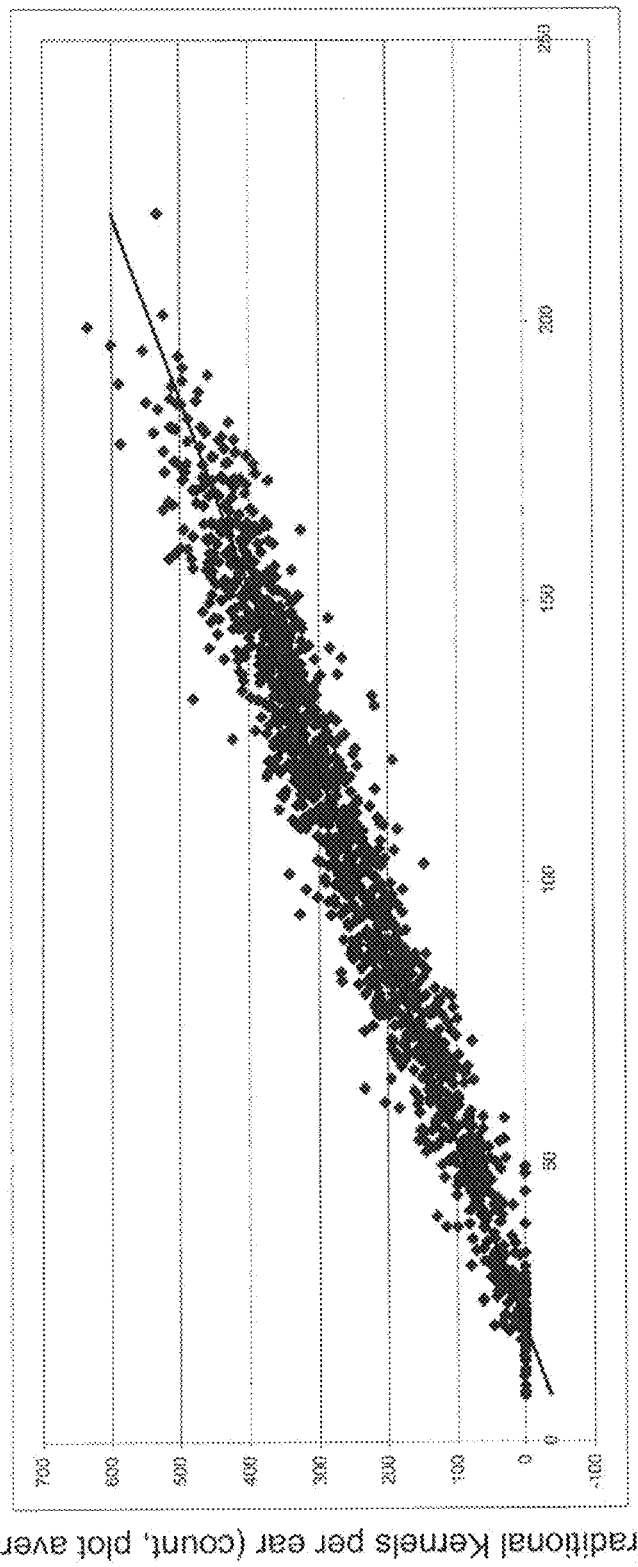
FIG. 8 is a graph illustrating regression of 1500 genotypes for digital kernels per ear.

FIG. 8 is a graph illustrating regression of 1500 elite breeding plots for digital kernels per ear. The graph shows the plot average of the automatically determined number of kernels per ear visible in the digital image along the x-axis (Digital KPE). The average number of kernels per ear for each plot for the traditionally counted kernels per ear is shown along the y-axis (Traditional KPE). From this information, a linear regression was performed to relate the Digital KPE to the Traditional KPE. In addition, an $R^2$ value was determined in order to provide a measure of the accuracy of the linear regression. Note that the $R^2$ value is relatively high for linear fit.

$$\text{Traditional KPE–Digital KPE} \, y=3.0249x-61.956, R^2=0.9456$$

Another linear regression was performed for relating the traditional kernels per ear to the digitally determined area. Again, note that the $R^2$ value is relatively high for the linear fit.

$$\text{Traditional KPE–Area} \, y=0.0071x+0.1439, R^2=0.9449$$

Yet another linear regression was performed for relating the traditional kernels per ear to the maximum major axis length. Again, a relatively high $R^2$ value was determined.

$$\text{Traditional KPE–Max major length} \, y=0.0072x+0.4643, R^2=0.9244$$

Figure 9:
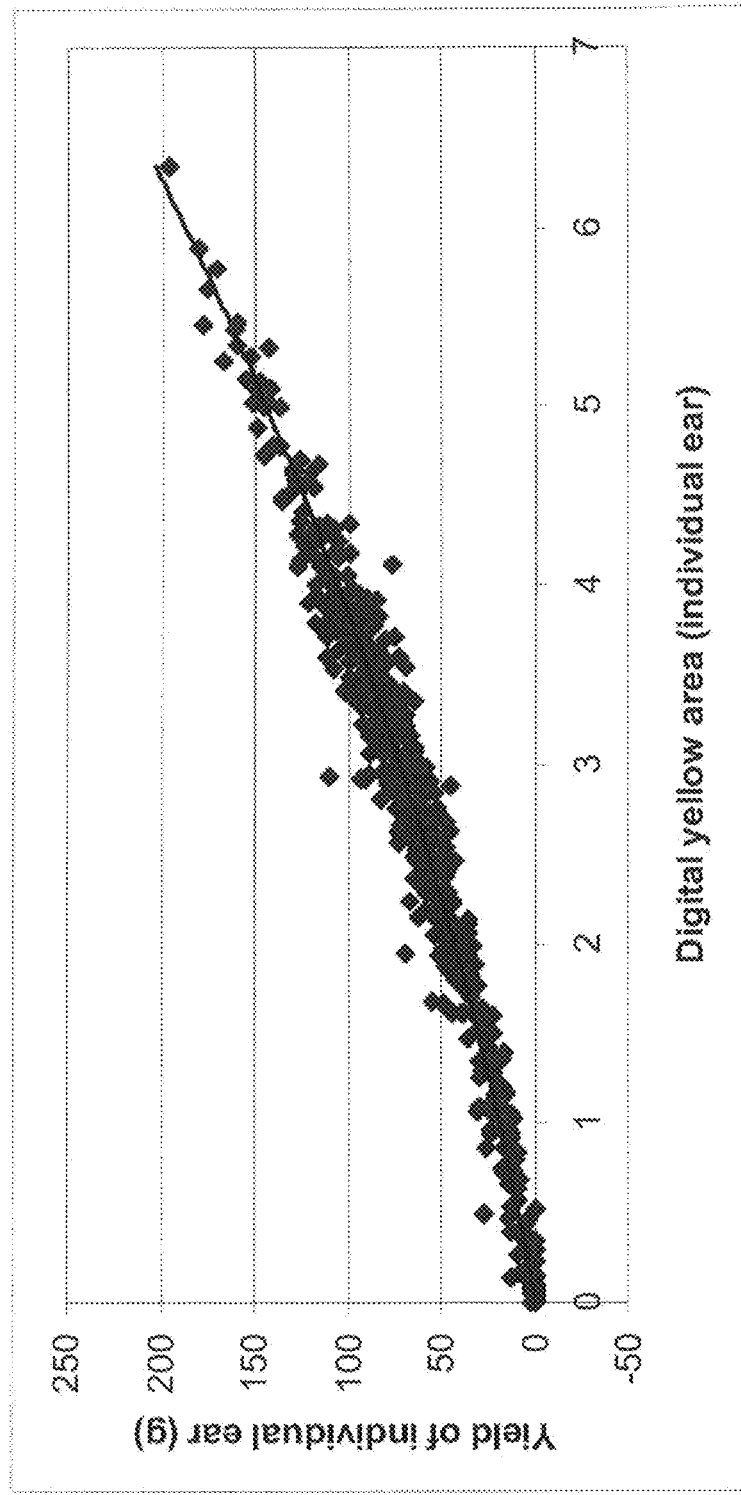
FIG. 9 is a graph illustrating regression of 630 individual ears for yield versus digital area of filled kernels.

FIG. 9 is a graph illustrating regression of 630 individual ears relating the yield of each individual ear in grams to the filled kernel area of each individual year. A relatively high $R^2$ value is associated with the quadratic fit.

$$\text{Traditional yield–filled kernel area} \, y=2.3535x^2+17.028x-0.7258, R^2=0.97$$

The below table provides $R^2$ from regressions of 12 elite breeding family averages (about 115 points per family) comparing yield to digital filled kernel area and kernels to digital filled kernel area.

| $R^2$ | Yield | Kernels per ear |
|---|---|---|
| KPE | 0.96 | 0.95 |
| Digital KPE | 0.96 | 0.97 |
| Area | 0.98 | 0.99 |
| Length | 0.96 | 0.99 |

Although linear regression has been used in the above examples, it is to be understood that other types of relationships may be more appropriate depending upon the physical parameters being related and the number of physical parameters being related.

These results suggest that digital imaging (filled kernel area estimation) can replace traditional manual kernel counts, and traditional yields.

Within-Plot Variability

The data extracted from the images may be used to quantify within-plot variability. A "plot" is simply an area where multiple plants of similar genetic background are grown. Within-plot variability describes variations between plants within the plot. Examples of types of within-plot variability measurements include, without limitation, proportion of repressed plants, or the standard error, standard deviation, relative standard deviation, skew, kurtosis, variance, coefficient of variation, interquartile range, Gini's mean difference or range of ear traits.

Figure 10:
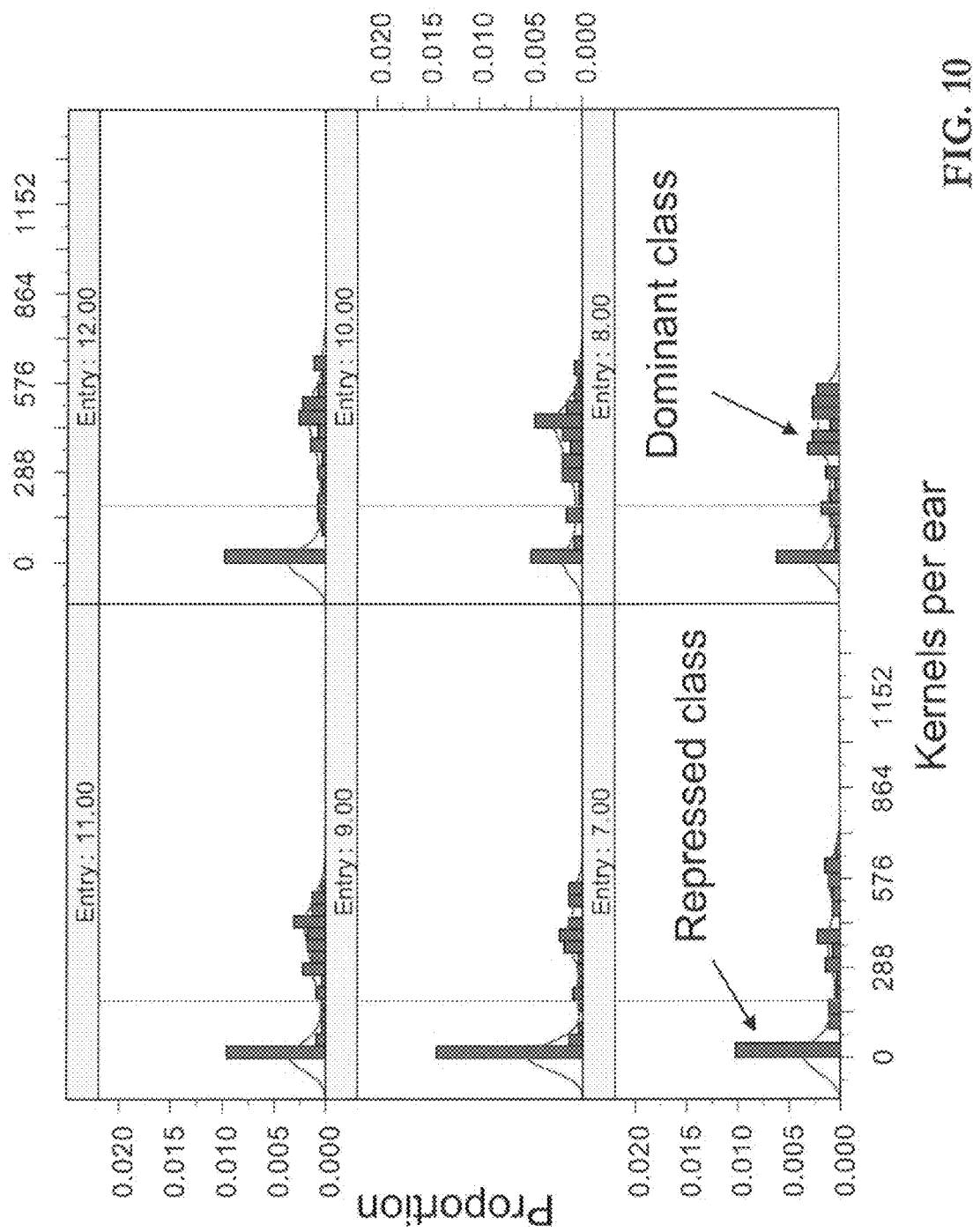
FIG. 10 is a graph showing proportion of repressed plants.

Proportion of repressed plants is found to be one useful measure of variability for a set of plants associated with a plot. Proportion of repressed plants (PROPREP) is calculated as the number of repressed plants divided by the total number of plants in a plot. FIG. 10 is a graph explaining the origin of the calculation of the proportion of repressed plants. Plots of kernels per ear for individual plants exhibit two classes of plants when the plants are grown under stress. Referring to Entry 8, the first class of plants possesses greater than 160 kernels per ear. These plants are referred to as non-repressed. Referring to Entry 7, for example, there is a second class of plants that includes ears with 0 to 160 kernels per ear. These ears are referred to as repressed.

Figure 11:
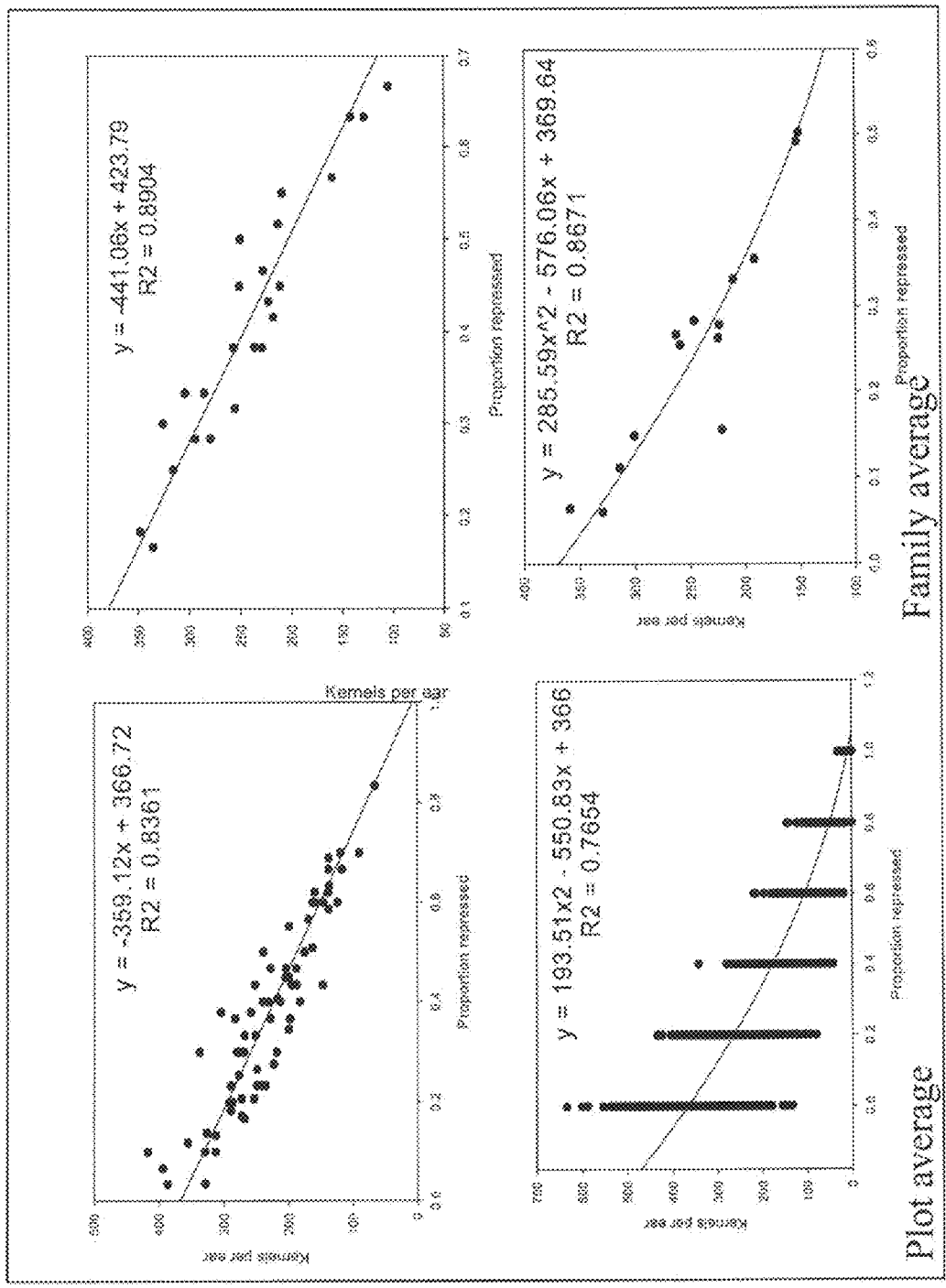
FIG. 11 is a graphs illustrating relationship between kernels per ear under stress and proportion of repressed plants.
Figure 12:
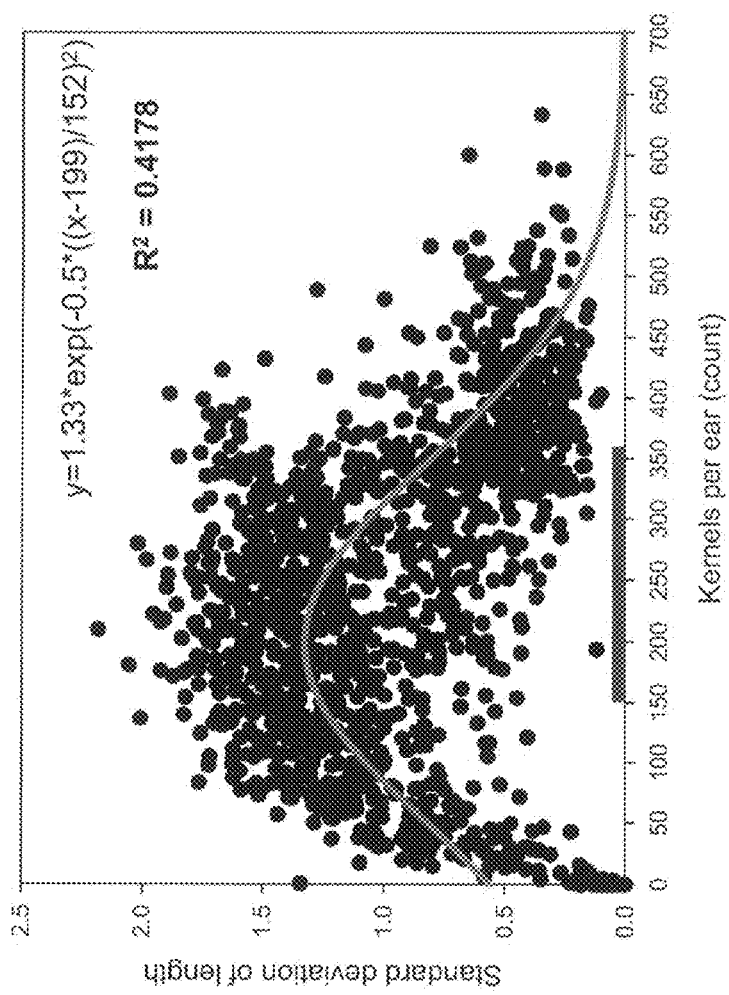
FIG. 12 is a graph illustrating kernels per ear (count versus standard deviation of length).

FIG. 11 provides graphs illustrating the relationship between kernels per ear under flowering stress and PROPREP. PROPREP predicts kernels per ear under flowering stress across multiple studies, indicating that direct selection on this trait will increase yield stability. Thus, determining kernels per ear automatically may be used for breeding purposes. In particular, chromosomal regions associated with proportion of repressed plants may be identified. Analysis and identification of the chromosomal regions enables molecular breeding with associated markers. FIG. 12 is a graph illustrating kernels per ear (count versus the standard deviation of length). Thus, it should be clear that in addition to PROPREP, other measures of within-plot variability can be made. Note that in FIG. 12, low standard deviations are observed at extremes of kernels per ear (i.e. those plots with five uniformly tiny or large ears).

Kernel Distributions

Figure 14:
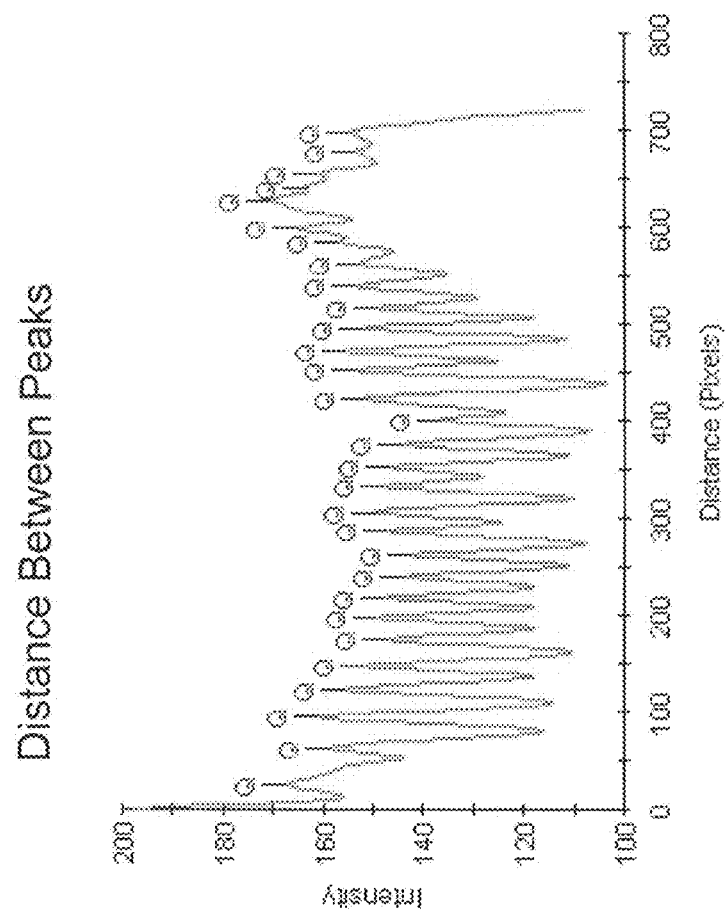
FIG. 14 is a graph illustrating distances between peaks which correspond to kernel width.
Figure 13:
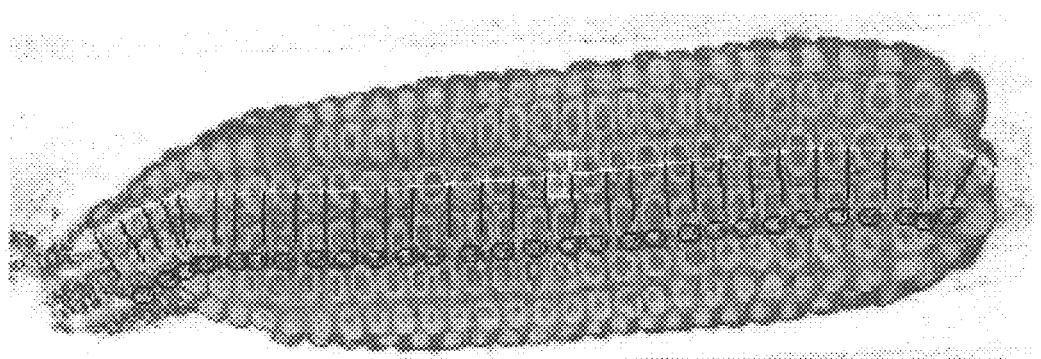
FIG. 13 is an image of an ear of maize with a trace drawn along one row for use in determining kernel width.

Kernel distributions within ears have also been measured. FIG. 13 is an image of an ear of maize with a trace drawn along one row for use in determining kernel size. A user draws trace along one row and an imaging program such as Image Pro can be used to automatically identify "peaks" between kernels. FIG. 14 provides a graph showing that Image Pro is able to automatically identify the peaks between kernels and measure the distance between those peaks.

Figure 15:
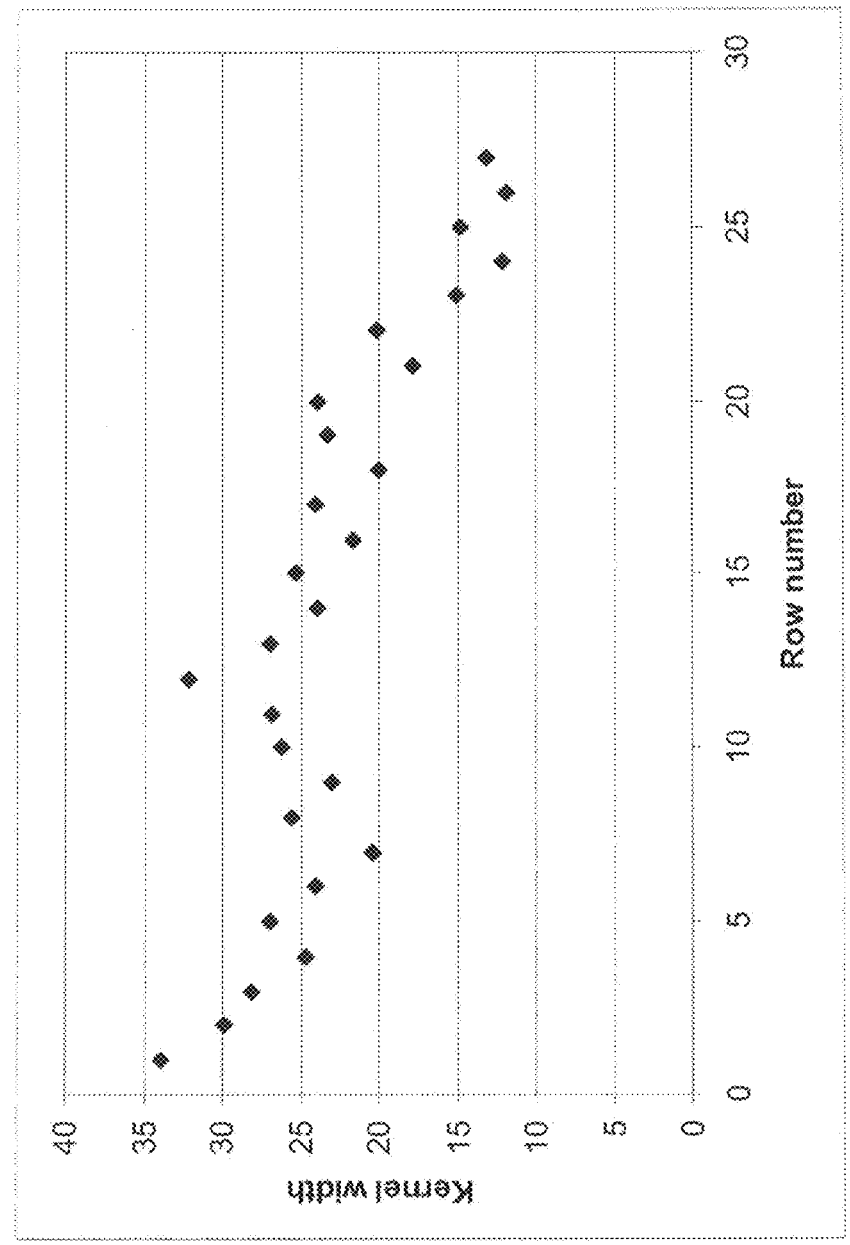
FIG. 15 is a graph illustrating kernel size distributions within an ear.

FIG. 15 is a graph from Microsoft Excel illustrating kernel size distributions within an ear generated from a trace such as the one shown in FIG. 13. Using this data, kernel size distributions within ears may be measured. This information may be output to Microsoft Excel or another spreadsheet program or other application to determine the distances between "peaks" which corresponds to kernel width.

Figure 16:
FIG. 16 is a digital image of five ears of maize.

FIG. 16 is a photographic representation of an image of five ears of maize exhibiting aborted kernels at the tip of the ear. The proportion of kernels aborted may be measured by processing such an image.

Figure 17:
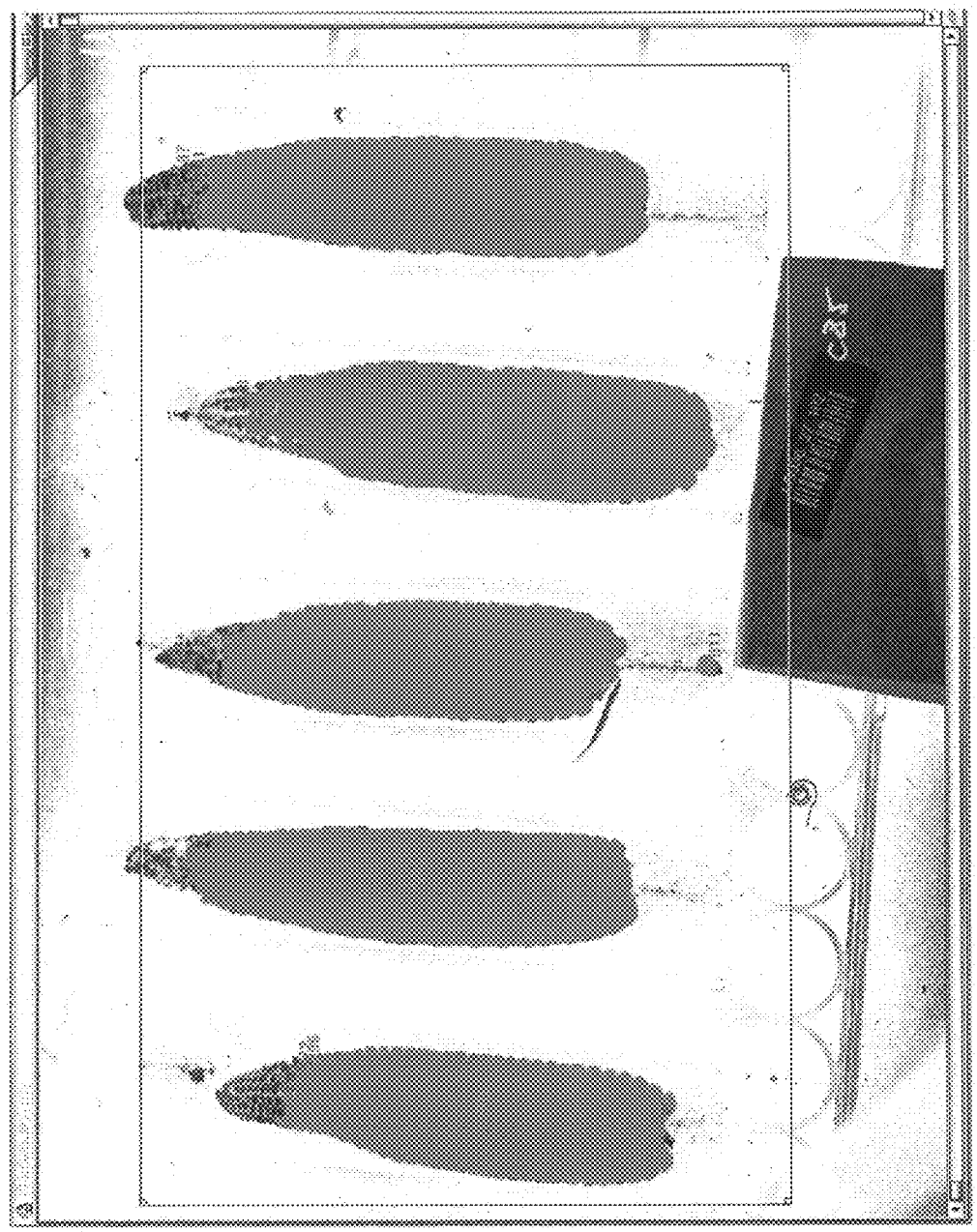
FIG. 17 is a representation of FIG. 16 where a first pallette is used to select all kernels and output the maximal length.

In FIG. 17, a first palette is used to select all kernels and output the maximal length.

Figure 18:
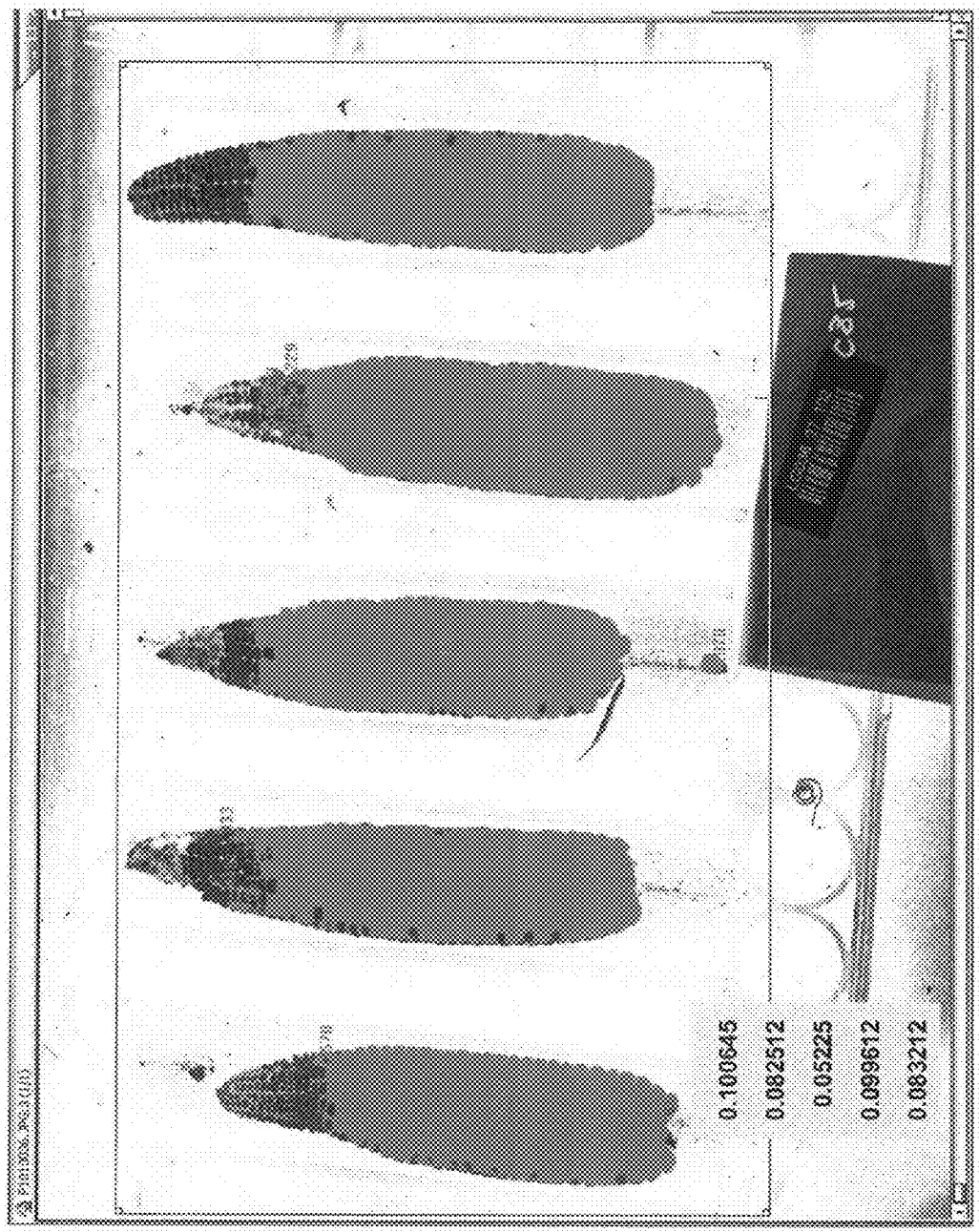
FIG. 18 is a representation of FIG. 16 where a second palette is used to select non-aborted kernels and output the maximal length.

In FIG. 18, a second palette is used to select non-aborted kernels and output the maximal length. A determination is also shown as to the proportional length loss due to kernel abortion. For each ear from left to right, the proportion length loss due to kernel abortion is 0.100645, 0.082512, 0.05225. 0.099612, 0.083212.

Methods of Operation

Figure 19:
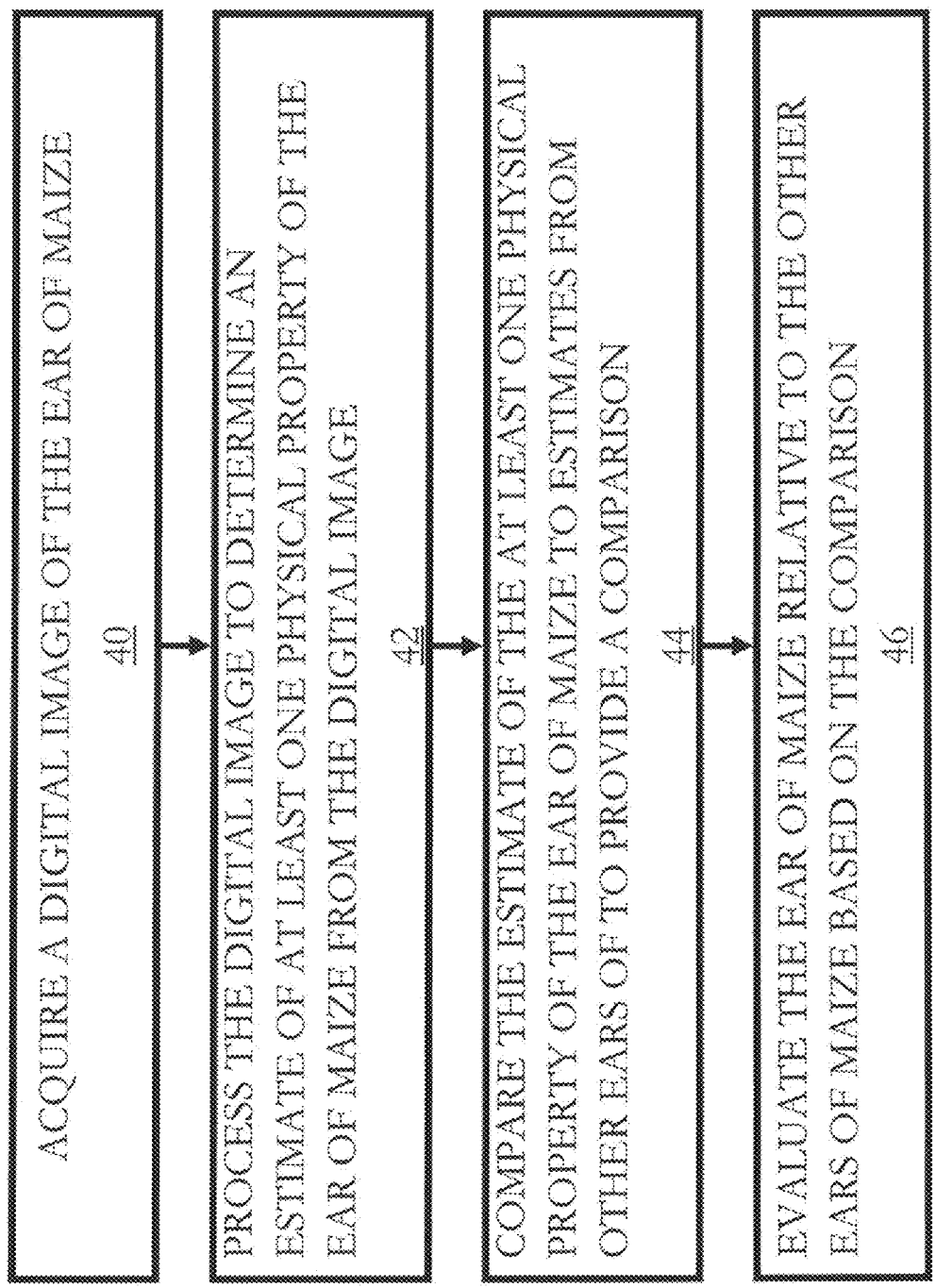
FIG. 19 is a flow diagram of a method for evaluating an ear of maize using digital imagery.

FIG. 19 is a flow diagram of a method of evaluating an ear of maize using digital imagery. In step 40, a digital image of an ear of maize is acquired. In step 42, the digital image is processed to determine an estimate of at least one physical property of the ear of maize from the digital image. The processing can include applying a spectral filter to the digital image. The step of processing can also include extracting a filled kernel area from the ear of maize using a predetermined color palette and then counting the number of kernels on the ear of maize represented in the digital image. In step 44, the estimate of the at least one physical property of the ear of maize is compared to estimates from other ears to provide a comparison. The other ears may be on the same plant, in the same plot or remotely located plots. In step 46, the ear of maize is evaluated relative to the other ears of maize based on the results of the comparison. The physical properties involved may include, without limitation, yield or kernel count.

Figure 20:
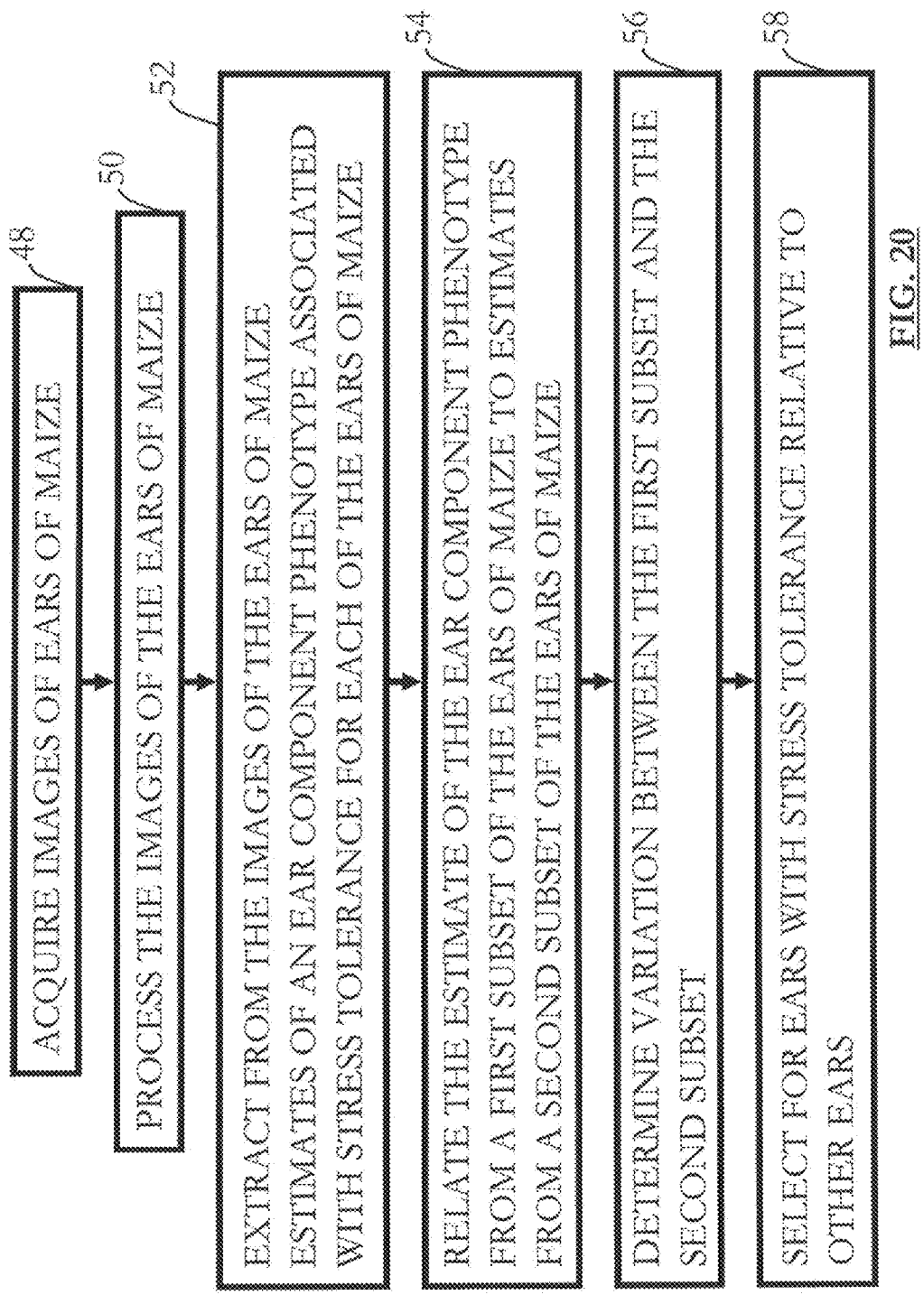
FIG. 20 is a flow diagram of a method for using image processing in screening maize to determine the maize more likely to exhibit stress tolerance and/or those less likely to exhibit stress tolerance.

FIG. 20 is a flow diagram of a method for using image processing in screening maize to determine the maize more likely to exhibit stress tolerance and/or the maize less likely to exhibit stress tolerance. In step 48, images of ears of maize are acquired. In step 50, the images of the ears of maize are processed. In step 52, estimates of an ear component phenotype associated with stress tolerance for each of the ears of maize is extracted. In step 54, the estimate of the ear component phenotype from a first subset is related to estimates from a second subset of the ears of maize. The first subset and the second subset may consist of ears of maize grown in a single plot or grown in multiple plots. In step 56, variation between the first subset and the second subset is determined. In step 58, ears with stress tolerance relative to other ears are selected.

Figure 21:
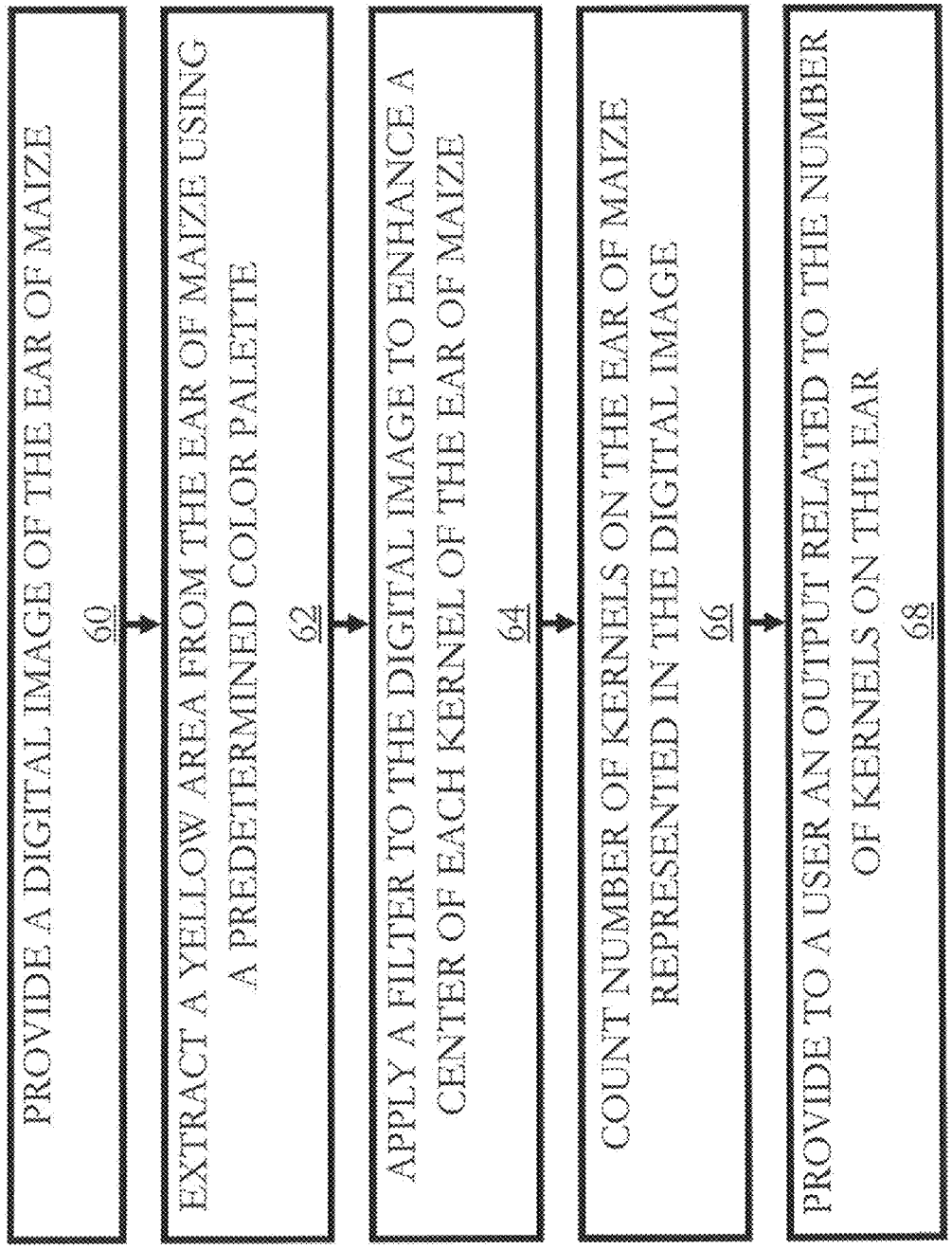
FIG. 21 is a flow diagram of a method of counting kernels on an ear of maize.

FIG. 21 is a flow diagram of a method of counting kernels on an ear of maize. In step 60, a digital image of an ear of maize is acquired. In step 62, a filled kernel area from the ear of maize is extracted using a predetermined color palette. In step 64, a filter is applied to the digital image to enhance a center of each kernel on the ear of maize. In step 66, the number of kernels on the ear of maize represented in the digital image is counted. In step 68, a user is provided an output related to the number of kernels on the ear. The output may be provided on a display or printed form, or through an effect on an automated process.

Figure 22:
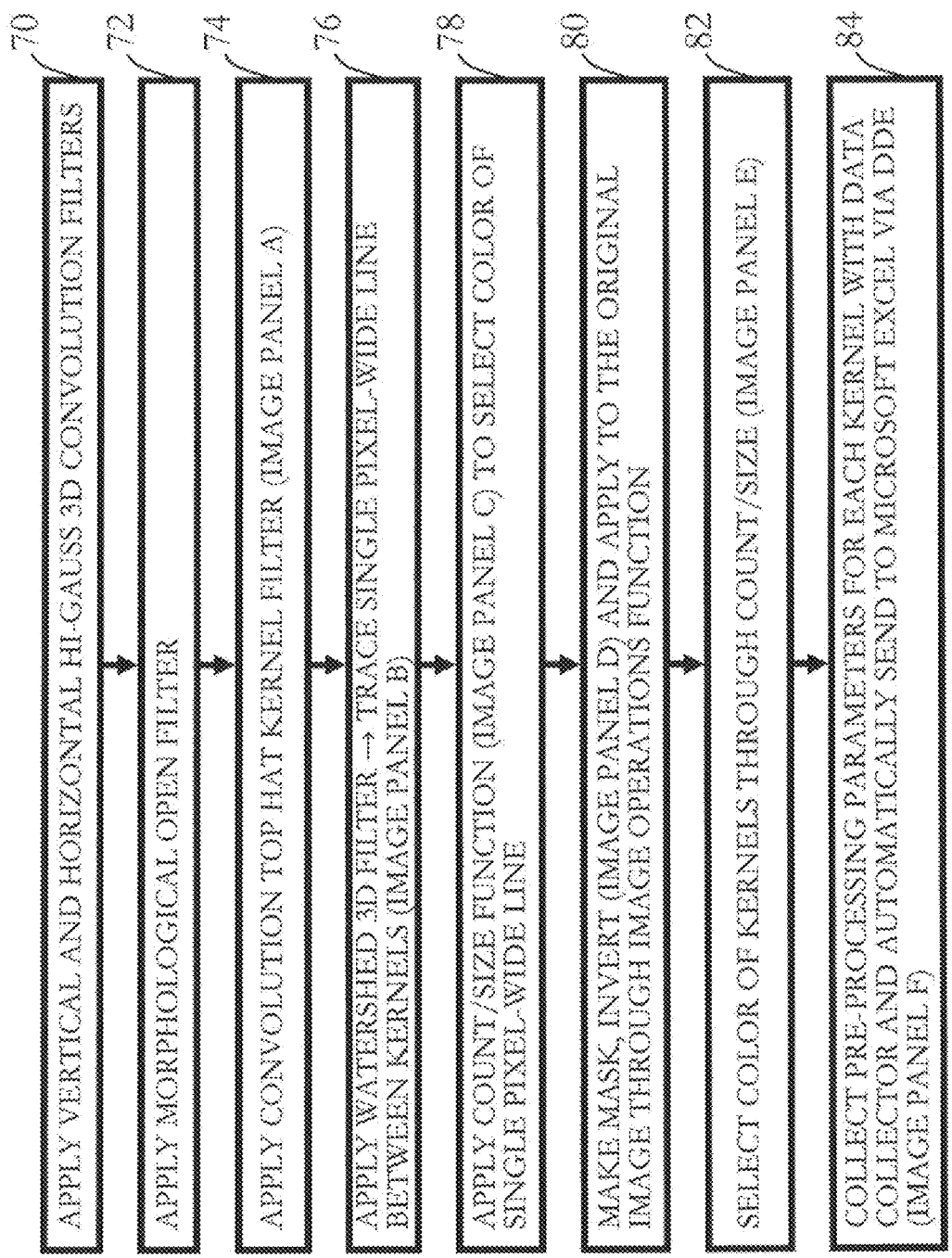
FIG. 22 is a flow diagram of an alternate method of counting kernels on an ear of maize.
Figure 23:
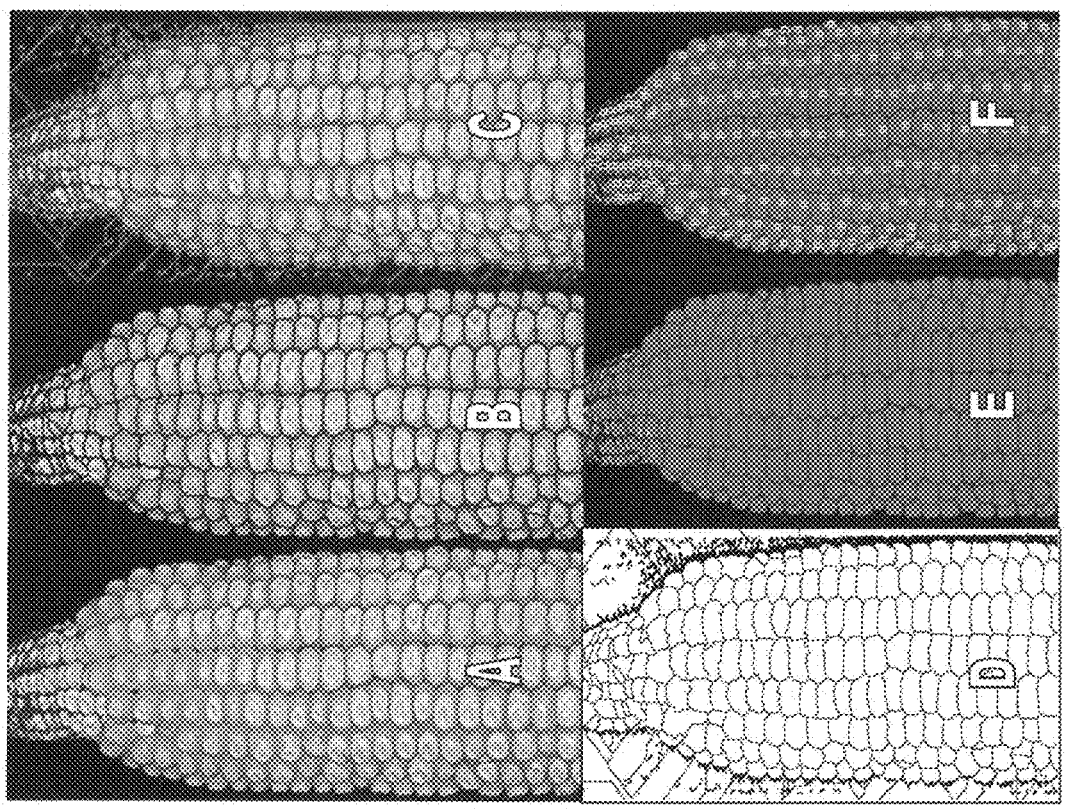
FIG. 23 is an image illustrating method in FIG. 22 of counting kernels on an ear of maize.

FIG. 22 and FIG. 23 illustrate another example of a methodology. In FIG. 22, step 70 vertical and horizontal hi-gauss 3D convolution filters are applied. Next, in step 72 a morphological open filter is applied. In step 74 a convolution top hat kernels filter is applied. The output at this point in the method is shown in panel A of FIG. 23. Returning to FIG. 22, in step 76, a watershed 3D filter is applied for tracing single pixel-wide line between kernels. The resulting image at this point in the method is shown in panel B of FIG. 23. Returning to FIG. 22, in step 78 a count/size function is applied to select the color of the single pixel-wide line. The result of this step is shown in panel C of FIG. 23. Next in step 80 a mask is made and inverted (as shown at panel D of FIG. 23) and the mask is applied to the original image through image operations functions. In step 92, the color of kernels is selected through use of the count/size function. FIG. 23, panel E shows this step. In step 94, pre-processing parameters are collected for each kernel with a data collector and the pre-processing parameters are automatically sent to an application such as Microsoft Excel via dynamic data exchange (DDE) or appended to a text file. This is shown in FIG. 23, image panel F. The method shown in FIGS. 22 and 23 is merely one method. The specific filters applied, image operations applied, functions used, and software applications used may vary in numerous ways.

Examples of pre-processing parameters include, but are not limited to those in the below table.

| PRE-PROCESSING PARAMETERS |
| --- |
| Ear filled kernel width |
| Ear filled kernel area |
| Ear filled kernel + cob length |
| Ear filled kernel + cob width |
| Ear filled kernel + cob area |
| Ear color |
| Ear elliptical eccentricity |
| Ear color density |
| Kernel area |
| Kernel color (red, blue, green density) |
| Kernel elliptical eccentricity |
| Filled kernel count |
| Aborted kernel count |
| Kernel length |
| Kernel width |
| Kernel location in image (x, y coordinates) |
| Ear length of filled kernels |
| Ear length of filled + aborted kernels |
| Ear area of filled + aborted kernels |
| Ear area of aborted kernels |
| Area of insect or disease evidence |

Examples of post-processing traits include, but are not limited to those set forth in the following table:

| POST-PROCESSING TRAITS |
| --- |
| Percent tip kernel abortion |
| Number of kernels aborted |
| Kernel size |
| Percent of loss due to scattergrain |
| Kernels per ear image |
| Kernel shape |
| Ear shape |
| Ear length |
| Ear width |
| Area of filled kernels |
| Kernel size distribution from base to tip |
| 100 Kernel weight |
| Kernel color |
| Percent of repressed plants within a plot |
| Percent insect or disease damage |
| Kernel starch content |
| Kernel fill pattern (regular/irregular) |
| Kernel texture |
| Within plot variation of any of the above traits |

Thus, the results provided may be used in any number of applications. Such applications, include, without limitation, studying of genetic variation on a plant-to-plant basis, quantifying plant-to-plant variability for stress tolerance, quantifying damage resulting from *Fusarium verticilliodes, Diplodia maydis, Ustilago maydis, Agrotis Ipsilon, Blissus Leucopterus, Agramyza parvicorreis* and/or other diseases and/or insects, characterizing ear type for direct breeding (ear shape and size, kernel shape and size, kernel texture), clarifying within-ear carbon partitioning through grain size changes from base to tip of ear, quantifying tip-kernel abortion, nosing back, scattergrain or abnormal kernel set effects, measuring genotypic response to micro-environmental variation in the field (proxy for measurement of large scale genotype by environment effects), testing for the effects of introduced transgenes and/or genetic regions (QTL), and determining the degree to which progeny of a cross are phenotypically similar to each parent.

| NUM | OUTPUT# | COUNT | CENTRX | CENTRY | AREASUM | AREAAV |
| --- | --- | --- | --- | --- | --- | --- |
| 1 | 1 | 135 | 35.35246 | 13.48555 | 32.53858 | 0.2410265 |
| 1 | 2 | 182 | 1706.097 | 658.8908 | 92396 | 507.6703 |
| 1 | 3 | 3 | 34.99506 | 18.08275 | 42.1449 | 14.0483 |
| 1 | 4 | 1 | 35.56424 | 14.30337 | 49.12507 | 49.12507 |
| 1 | 5 | 2 | 35.03009 | 9.472943 | 53.31369 | 26.65684 |
| 2 | 1 | 172 | 27.39945 | 12.36879 | 38.41016 | 0.2233149 |
| 2 | 2 | 219 | 1325.732 | 611.4419 | 105996 | 484 |
| 2 | 3 | 2 | 28.23376 | 11.20392 | 49.2149 | 24.60745 |
| 2 | 4 | 1 | 27.63672 | 13.81572 | 51.7849 | 51.7849 |
| 2 | 5 | 1 | 27.56835 | 13.25037 | 55.72996 | 55.72996 |
| 3 | 1 | 136 | 11.21523 | 13.79884 | 33.92744 | 0.2494665 |
| 3 | 2 | 171 | 541.6906 | 680.0285 | 91096 | 532.7251 |
| 3 | 3 | 1 | 11.37113 | 15.08384 | 41.4021 | 41.4021 |
| 3 | 4 | 1 | 11.36911 | 15.10278 | 44.25109 | 44.25109 |
| 3 | 5 | 3 | 11.10934 | 9.269123 | 47.76082 | 15.92027 |
| 4 | 1 | 148 | 19.00307 | 15.55257 | 32.92034 | 0.2224347 |
| 4 | 2 | 185 | 921.41 | 767.9702 | 92518 | 500.0972 |
| 4 | 3 | 2 | 18.349 | 14.0886 | 43.79158 | 21.89579 |
| 4 | 4 | 1 | 19.20257 | 16.85983 | 45.85631 | 45.85631 |
| 4 | 5 | 2 | 18.68104 | 12.28019 | 50.83179 | 25.41589 |
| 5 | 1 | 152 | 2.9933 | 16.31716 | 35.48301 | 0.2334408 |
| 5 | 2 | 182 | 145.7958 | 794.9655 | 93298 | 512.6264 |
| 5 | 3 | 1 | 2.93908 | 17.20154 | 42.43209 | 42.43209 |
| 5 | 4 | 1 | 2.941012 | 17.30406 | 47.32983 | 47.32983 |
| 5 | 5 | 1 | 2.951466 | 16.96155 | 49.79877 | 49.79877 |

| NUM | OUTPUT# | MAXLNGTH | AVMAJOR | AVMINOR | MAXMAJOR | MAXMINOR |
|---|---|---|---|---|---|---|
| 1 | 1 | 0.9375152 | 0.6804908 | 0.4470006 | 0.9380788 | 0.6932975 |
| 1 | 2 | 45.1134 | 31.06593 | 20.39133 | 45.14059 | 33.36165 |
| 1 | 3 | 13.84423 | 4.95667 | 1.444745 | 13.95419 | 4.002734 |
| 1 | 4 | 13.89831 | 14.6818 | 4.300627 | 14.6818 | 4.300627 |
| 1 | 5 | 17.47058 | 8.502855 | 2.205065 | 16.70202 | 4.156119 |
| 2 | 1 | 0.94635 | 0.678732 | 0.4059304 | 0.9773213 | 0.6636778 |
| 2 | 2 | 45.53845 | 31.09625 | 19.20178 | 47.02894 | 31.93634 |
| 2 | 3 | 14.20953 | 7.71265 | 2.258259 | 14.98868 | 4.23881 |
| 2 | 4 | 14.24719 | 15.30998 | 4.338285 | 15.30998 | 4.338285 |
| 2 | 5 | 16.55908 | 16.89877 | 4.233573 | 16.89877 | 4.233573 |
| 3 | 1 | 1.017845 | 0.730448 | 0.422351 | 1.051235 | 0.7068508 |
| 3 | 2 | 48.979 | 33.01937 | 19.97027 | 50.58573 | 34.01385 |
| 3 | 3 | 12.15361 | 12.80303 | 4.218792 | 12.80303 | 4.218792 |
| 3 | 4 | 12.15609 | 13.19649 | 4.310743 | 13.19649 | 4.310743 |
| 3 | 5 | 14.17752 | 5.199972 | 1.669618 | 14.49537 | 4.205476 |
| 4 | 1 | 0.8975479 | 0.6627097 | 0.4128374 | 0.9318126 | 0.6561371 |
| 4 | 2 | 43.19018 | 31.1147 | 19.90239 | 44.83906 | 31.57348 |
| 4 | 3 | 11.89686 | 6.517767 | 2.362834 | 12.36636 | 4.561096 |
| 4 | 4 | 11.94049 | 12.71326 | 4.624691 | 12.71326 | 4.624691 |
| 4 | 5 | 14.01496 | 7.927475 | 2.694953 | 14.21309 | 4.502914 |
| 5 | 1 | 0.9384155 | 0.6656501 | 0.4447012 | 0.8889209 | 0.644022 |
| 5 | 2 | 69.07759 | 31.1538 | 20.8532 | 73.15811 | 30.9905 |
| 5 | 3 | 12.53186 | 13.00028 | 4.272011 | 13.00028 | 4.272011 |
| 5 | 4 | 12.55004 | 13.4672 | 4.502485 | 13.4672 | 4.502485 |
| 5 | 5 | 14.05047 | 14.4321 | 4.420476 | 14.4321 | 4.420476 |

From information shown in the above table, additional information is calculated. The below table describes trait names and a description of the traits that may be calculated.

| Trait Name | Description | Units | Values |
|---|---|---|---|
| TKERAB* | Percent of ear length affected by kernel abortion (via photometric analysis) | Percent (%) | 0 to 100 |
| SCTTER | Percent of ear area lost due to scatter grain (via photometric analysis) | Percent (%) | 0 to 100 |
| KERFIL | Percent of total ear area with filled kernels (via photometric analysis) | Percent (%) | 0 to 100 |
| KERARE | Average area per kernel (via photometric analysis) | (cm$^2$) | 0 to 1 |
| KERSHA | Average kernel shape {elliptical eccentricity of individual kernel area; 0 = circular; 1 = strongly oval and elongated} (via photometric analysis) | Unitless | 0 to 1 |
| EARSHA | Ear shape {elliptical eccentricity of ear area; 0 = circular; 1 = strongly oval and elongated} (via photometric analysis) | Unitless | 0 to 1 |
| PHTYLD | Yield per acre at 15% moisture | Bu/ac | 0 to 500 |
| PHTKPE | Total number of kernels per ear | Count | 0 to 1000 |
| PROPREP | Proportion of repressed plants is measured on plot basis by assigning a proportion to the repressed plants to total plants in the plots | Proportion | 0 to 1 |

Note that all of these traits may be measured in a high throughput fashion. In addition, all of these traits may be measured on a per plant basis in a high throughput fashion.

The following table illustrates how traits may be calculated:

Trait calculations

KERFIL = (Area of total ear − Area of filled kernels)/Area of total ear
TKERAB = (Length of total ear − Length of filled kernels with cob)/Length of total ear
SCTTER = (Area of filled kernels with cob − Area of filled kernels)/Area of filled kernels with cob
EARSHA = $(1 - (\text{Minor axis of total ear}^2/\text{Major axis of total ear}^2))^{1/2}$
KERSHA = $(1 - (\text{Av. kernel minor axis}^2/\text{Av. kernel major axis}^2))^{1/2}$
KERARE = Av. kernel area
EARLGT = Length of total ear
KEREAR = 0.0033 * (Total kernel count$^2$) + 1.76 * (Total kernel count) − 1.92
YIELD = 0.0003 * (Area of total ear$^2$) + 0.0106 * (Area of total ear)

The following tables illustrate calculations based on experimental results.

| NUM | KERFIL (%) | TKERAB (%) | SCTTER (%) | YIELD (bu/ac) | KEREAR (COUNT) |
|---|---|---|---|---|---|
| 1 | 0.790508029 | 0.204473463 | 0.142089772 | 0.979593719 | 417.772 |
| 2 | 0.883095915 | 0.13961464 | 0.049628367 | 1.248309855 | 527.403 |
| 3 | 0.866863257 | 0.142579943 | 0.064382369 | 0.953102425 | 386.763 |
| 4 | 0.861499861 | 0.14801826 | 0.045026083 | 1.039501492 | 426.355 |
| 5 | 0.852071045 | 0.106788599 | 0.103481039 | 0.989924833 | 417.772 |

| NUM | EARLGT (CM) | KERARE (CM²) | KERSHA | EARSHA |
|---|---|---|---|---|
| 1 | 17.47058 | 0.2410265 | 0.753995388 | 0.968544786 |
| 2 | 16.55908 | 0.2233149 | 0.801442602 | 0.968109998 |
| 3 | 14.17752 | 0.2494665 | 0.815889278 | 0.956988617 |
| 4 | 14.01496 | 0.2224347 | 0.782258781 | 0.948487495 |
| 5 | 14.05047 | 0.2334408 | 0.744097976 | 0.951936734 |

The table below shows an example of individual kernel output for a particular ear. For each kernel identified in the ear, an area is determined, a location (center-x, center-y) is determined and a box height and box width associated with the kernel is provided.

| INDIVIDUAL KERNEL OUTPUT FOR EAR 5 | | | | |
|---|---|---|---|---|
| Area (Values) | Center-X (Values) | Center-Y (Values) | Box Height (Values) | Box Width (Values) |
| 0.079462 | 2.72788 | 10.2211 | 0.311719 | 0.3948441 |
| 0.059165 | 3.237934 | 10.20845 | 0.2493752 | 0.4364066 |
| 0.057438 | 2.366096 | 10.38344 | 0.311719 | 0.2909377 |
| 0.065211 | 3.613188 | 10.39283 | 0.2701565 | 0.3948441 |
| 0.107102 | 2.697626 | 10.51431 | 0.311719 | 0.4987504 |
| 0.114875 | 3.672425 | 10.69321 | 0.3740628 | 0.4779692 |
| 0.224568 | 2.159413 | 10.98613 | 0.8104695 | 0.4987504 |
| 0.101919 | 3.156815 | 10.79569 | 0.311719 | 0.5818755 |
| 0.16713 | 2.624615 | 10.84954 | 0.3948441 | 0.5610942 |
| 0.077735 | 3.656349 | 10.99086 | 0.2493752 | 0.4364066 |
| 0.171017 | 3.190554 | 11.11241 | 0.4571879 | 0.5610942 |
| 0.053983 | 4.116021 | 11.14507 | 0.2701565 | 0.3325003 |
| 0.180086 | 2.562923 | 11.22776 | 0.4156253 | 0.5610942 |
| 0.167994 | 3.673957 | 11.31195 | 0.4156253 | 0.5818755 |
| 0.111852 | 3.086861 | 11.42889 | 0.4779692 | 0.4987504 |
| 0.05096 | 4.12878 | 11.48288 | 0.3532815 | 0.2909377 |
| 0.293666 | 1.920464 | 11.66849 | 0.6857818 | 0.7065631 |
| 0.133445 | 2.578088 | 11.56225 | 0.3532815 | 0.5195317 |
| 0.132581 | 3.627177 | 11.69504 | 0.3948441 | 0.6234381 |
| 0.221113 | 3.06751 | 11.79917 | 0.4779692 | 0.6442193 |
| 0.068666 | 4.125016 | 11.80702 | 0.311719 | 0.3532815 |
| 0.168426 | 2.478246 | 11.89999 | 0.3948441 | 0.5610942 |
| 0.240115 | 3.68105 | 12.07993 | 0.5195317 | 0.6442193 |
| 0.138196 | 1.961297 | 12.12275 | 0.3948441 | 0.4779692 |
| 0.137332 | 4.178211 | 12.17331 | 0.4364066 | 0.4364066 |
| 0.264299 | 3.071858 | 12.23565 | 0.4987504 | 0.6857818 |
| 0.073848 | 1.588612 | 12.18268 | 0.3948441 | 0.3325003 |
| 0.225863 | 2.434587 | 12.28971 | 0.4987504 | 0.6650006 |
| 0.068234 | 4.555175 | 12.43272 | 0.4364066 | 0.311719 |
| 0.198656 | 3.660078 | 12.52279 | 0.4571879 | 0.6026568 |
| 0.233205 | 1.829598 | 12.56747 | 0.540313 | 0.5818755 |
| 0.172313 | 1.384897 | 12.74266 | 0.8104695 | 0.4364066 |
| 0.138196 | 4.208012 | 12.57435 | 0.3948441 | 0.540313 |
| 0.284597 | 3.027727 | 12.69991 | 0.540313 | 0.7065631 |
| 0.268618 | 2.375345 | 12.73921 | 0.540313 | 0.6442193 |
| 0.099328 | 4.670274 | 12.86324 | 0.4156253 | 0.3740628 |
| 0.213339 | 3.640003 | 12.92918 | 0.4779692 | 0.6234381 |
| 0.214635 | 4.224702 | 12.99 | 0.4987504 | 0.6234381 |
| 0.188723 | 1.814437 | 13.0406 | 0.4571879 | 0.5610942 |
| 0.226295 | 1.342057 | 13.39777 | 0.9143759 | 0.4364066 |
| 0.283301 | 3.018764 | 13.17152 | 0.540313 | 0.7273444 |
| 0.214203 | 2.359093 | 13.16937 | 0.4156253 | 0.6234381 |
| 0.321737 | 3.714324 | 13.39984 | 0.5610942 | 0.7273444 |
| 0.211612 | 4.333276 | 13.43814 | 0.4779692 | 0.5610942 |
| 0.203838 | 1.76654 | 13.47119 | 0.4987504 | 0.6234381 |
| 0.265163 | 2.358301 | 13.58793 | 0.4779692 | 0.7065631 |
| 0.271641 | 3.047347 | 13.62303 | 0.5195317 | 0.7273444 |
| 0.209885 | 3.709713 | 13.8446 | 0.4364066 | 0.6650006 |
| 0.266458 | 4.33025 | 13.90701 | 0.5195317 | 0.6650006 |
| 0.195633 | 1.745718 | 13.89299 | 0.4779692 | 0.5818755 |
| 0.122217 | 1.317517 | 13.98579 | 0.4779692 | 0.3532815 |
| 0.318714 | 2.365545 | 14.05303 | 0.5610942 | 0.7273444 |
| 0.279414 | 3.053369 | 14.07431 | 0.4987504 | 0.6857818 |
| 0.294961 | 3.686956 | 14.27323 | 0.5195317 | 0.7481257 |
| 0.214203 | 1.710265 | 14.32147 | 0.4779692 | 0.6026568 |
| 0.245729 | 4.335762 | 14.381 | 0.4987504 | 0.6442193 |

| INDIVIDUAL KERNEL OUTPUT FOR EAR 5 | | | | |
|---|---|---|---|---|
| Area (Values) | Center-X (Values) | Center-Y (Values) | Box Height (Values) | Box Width (Values) |
| 0.117466 | 1.270637 | 14.46888 | 0.5195317 | 0.3740628 |
| 0.304462 | 2.335726 | 14.52012 | 0.4987504 | 0.7481257 |
| 0.286756 | 3.03685 | 14.56676 | 0.540313 | 0.7065631 |
| 0.286756 | 3.730926 | 14.73517 | 0.5195317 | 0.7896882 |
| 0.230182 | 1.68336 | 14.75817 | 0.4779692 | 0.6650006 |
| 0.149424 | 4.341243 | 14.82161 | 0.3740628 | 0.6442193 |
| 0.066938 | 1.246608 | 14.85552 | 0.3325003 | 0.2909377 |
| 0.294961 | 2.381174 | 14.96035 | 0.4364066 | 0.8104695 |
| 0.096737 | 3.077669 | 14.91742 | 0.2285939 | 0.5195317 |
| 0.222409 | 3.699388 | 15.12868 | 0.4364066 | 0.7065631 |
| 0.255662 | 1.6843 | 15.1944 | 0.4779692 | 0.6650006 |
| 0.261708 | 4.378435 | 15.21638 | 0.4571879 | 0.6857818 |
| 0.323896 | 3.043209 | 15.29473 | 0.5195317 | 0.7481257 |
| 0.268618 | 2.339129 | 15.3906 | 0.4779692 | 0.7065631 |
| 0.286324 | 3.745769 | 15.55802 | 0.540313 | 0.7481257 |
| 0.217658 | 1.67182 | 15.62067 | 0.4364066 | 0.6857818 |
| 0.248752 | 4.395491 | 15.66323 | 0.4779692 | 0.6857818 |
| 0.284597 | 3.03211 | 15.77229 | 0.4779692 | 0.768907 |
| 0.284165 | 2.302552 | 15.82717 | 0.4987504 | 0.7065631 |
| 0.30619 | 3.722485 | 16.01429 | 0.540313 | 0.7896882 |
| 0.267754 | 1.627206 | 16.05178 | 0.4987504 | 0.6857818 |
| 0.224136 | 4.404508 | 16.1036 | 0.4571879 | 0.6857818 |
| 0.277255 | 2.97389 | 16.20744 | 0.4571879 | 0.7273444 |
| 0.298416 | 2.283203 | 16.29441 | 0.5195317 | 0.7065631 |
| 0.302303 | 3.678225 | 16.46508 | 0.4987504 | 0.768907 |
| 0.245297 | 1.649915 | 16.50428 | 0.4364066 | 0.6857818 |
| 0.231478 | 4.360732 | 16.52727 | 0.4779692 | 0.6857818 |
| 0.288051 | 2.968419 | 16.64757 | 0.4571879 | 0.768907 |
| 0.313531 | 2.292294 | 16.81439 | 0.5818755 | 0.6442193 |
| 0.251343 | 3.654504 | 16.91049 | 0.4571879 | 0.7065631 |
| 0.256094 | 1.662221 | 16.93386 | 0.4571879 | 0.768907 |
| 0.266026 | 4.314239 | 16.95259 | 0.4987504 | 0.6857818 |
| 0.297984 | 2.953018 | 17.08801 | 0.4571879 | 0.8312507 |
| 0.323464 | 2.278753 | 17.41556 | 0.6026568 | 0.6857818 |
| 0.237092 | 3.672001 | 17.32499 | 0.4364066 | 0.7065631 |
| 0.237524 | 1.659025 | 17.3442 | 0.4571879 | 0.6857818 |
| 0.241842 | 4.308105 | 17.3977 | 0.4571879 | 0.6650006 |
| 0.307053 | 2.982214 | 17.52746 | 0.4571879 | 0.7896882 |
| 0.320873 | 3.676914 | 17.79629 | 0.5818755 | 0.7481257 |
| 0.236228 | 1.64776 | 17.77322 | 0.4779692 | 0.6650006 |
| 0.263867 | 4.302879 | 17.87162 | 0.5195317 | 0.6442193 |
| 0.349808 | 2.273907 | 17.97672 | 0.5610942 | 0.7273444 |
| 0.302303 | 2.975224 | 17.98895 | 0.4779692 | 0.7481257 |
| 0.256094 | 1.625249 | 18.23281 | 0.4779692 | 0.6857818 |
| 0.253071 | 3.613564 | 18.26659 | 0.4779692 | 0.7273444 |
| 0.270345 | 4.220988 | 18.40032 | 0.5818755 | 0.6234381 |
| 0.251775 | 2.927628 | 18.42703 | 0.4364066 | 0.7273444 |
| 0.295393 | 2.247749 | 18.49347 | 0.4987504 | 0.7065631 |
| 0.26689 | 1.606412 | 18.71585 | 0.4987504 | 0.6650006 |
| 0.246593 | 3.633446 | 18.68494 | 0.4571879 | 0.7273444 |
| 0.297121 | 2.948403 | 18.8545 | 0.4779692 | 0.7481257 |
| 0.169721 | 4.102952 | 19.00862 | 0.6026568 | 0.4156253 |
| 0.079031 | 4.379624 | 19.01361 | 0.5818755 | 0.2493752 |
| 0.301871 | 2.256744 | 18.97416 | 0.4987504 | 0.768907 |
| 0.261708 | 3.600818 | 19.1261 | 0.4779692 | 0.7273444 |
| 0.254366 | 1.615011 | 19.20775 | 0.4987504 | 0.6442193 |
| 0.329078 | 2.938204 | 19.35382 | 0.5195317 | 0.7481257 |
| 0.332965 | 2.25311 | 19.48153 | 0.540313 | 0.768907 |
| 0.307485 | 4.207798 | 19.5716 | 0.5818755 | 0.6650006 |
| 0.279846 | 3.586629 | 19.6036 | 0.4987504 | 0.7065631 |
| 0.282005 | 1.627144 | 19.72957 | 0.540313 | 0.7273444 |
| 0.283733 | 2.921713 | 19.85443 | 0.4779692 | 0.7273444 |
| 0.285892 | 2.266194 | 19.9934 | 0.5195317 | 0.7273444 |
| 0.225 | 4.141775 | 20.08332 | 0.5195317 | 0.5610942 |
| 0.318282 | 3.552779 | 20.10986 | 0.5610942 | 0.7065631 |
| 0.24357 | 1.65749 | 20.23631 | 0.4779692 | 0.6442193 |
| 0.361468 | 2.936688 | 20.39141 | 0.5818755 | 0.7481257 |
| 0.302303 | 2.299714 | 20.50508 | 0.540313 | 0.7273444 |
| 0.356285 | 4.079502 | 20.64295 | 0.7273444 | 0.6857818 |
| 0.174904 | 3.517935 | 20.61435 | 0.4571879 | 0.4987504 |
| 0.305326 | 1.697186 | 20.72251 | 0.5610942 | 0.7896882 |
| 0.209885 | 4.618915 | 20.90527 | 0.5818755 | 0.5195317 |
| 0.346785 | 2.993952 | 20.9633 | 0.6234381 | 0.7273444 |

-continued

INDIVIDUAL KERNEL OUTPUT FOR EAR 5

| Area (Values) | Center-X (Values) | Center-Y (Values) | Box Height (Values) | Box Width (Values) |
|---|---|---|---|---|
| 0.229318 | 2.382175 | 21.01135 | 0.5195317 | 0.5818755 |
| 0.289779 | 3.653756 | 21.09274 | 0.5610942 | 0.7481257 |
| 0.209885 | 1.804934 | 21.20514 | 0.4156253 | 0.7273444 |
| 0.170153 | 4.246183 | 21.26593 | 0.540313 | 0.4987504 |
| 0.104079 | 4.687254 | 21.40307 | 0.4987504 | 0.3325003 |
| 0.141219 | 3.057642 | 21.39752 | 0.3532815 | 0.5610942 |
| 0.16929 | 2.487814 | 21.43778 | 0.3948441 | 0.5610942 |
| 0.386084 | 3.732702 | 21.6078 | 0.5818755 | 0.852032 |
| 0.335556 | 1.802353 | 21.66194 | 0.5818755 | 0.8104695 |
| 0.278119 | 4.368778 | 21.80632 | 0.6650006 | 0.6234381 |
| 0.333397 | 3.063003 | 21.84927 | 0.6234381 | 0.6650006 |
| 0.335988 | 2.45868 | 21.93161 | 0.6442193 | 0.7065631 |
| 0.392994 | 3.724163 | 22.17994 | 0.6026568 | 0.852032 |
| 0.275527 | 1.806928 | 22.22889 | 0.6234381 | 0.7481257 |
| 0.183541 | 4.285489 | 22.3935 | 0.5818755 | 0.5818755 |
| 0.330374 | 3.027274 | 22.46846 | 0.7065631 | 0.6234381 |
| 0.376583 | 2.430455 | 22.59376 | 0.7273444 | 0.7273444 |
| 0.358877 | 3.584681 | 22.75564 | 0.6442193 | 0.8312507 |
| 0.249616 | 1.921764 | 22.83297 | 0.6234381 | 0.7273444 |
| 0.214203 | 4.102499 | 22.94545 | 0.6442193 | 0.6026568 |
| 0.112716 | 1.482317 | 23.04714 | 0.4987504 | 0.6857818 |
| 0.281142 | 2.714908 | 23.10937 | 0.6026568 | 0.768907 |
| 0.32951 | 3.393883 | 23.25805 | 0.5610942 | 0.8728133 |

Other traits may be determined based on the image processing including, but not limited to ear color (such as red, blue, green density), kernel color (such as red, blue, green density), percent damage resulting from *Fusarium verticilliodes, Diplodia maydis, Ustilago maydis, Agrotis Ipsilon, Blissus Leucopterus, Agramyza parvicorreis* and/or other diseases and/or insects, kernel starch content, kernel fill pattern (such as regular or irregular), kernel texture, within plot variation of any of the above traits, linear slope of kernel area distribution, exponential slope of kernel area distribution, critical kernel ring of kernel area distribution, and count of total kernel rings from kernel area distribution.

Figure 24C:

FIG. 24A-24L illustrate one example of a process. FIG. 24A illustrates portions of an original image of an ear taken under controlled lighting conditions. Two views of the original are shown, with the left image being shown at 50 percent size and the right image being shown at 100 percent size.

FIG. 24B illustrates results of processing the image shown in FIG. 24A. In FIG. 24B, the background has been removed and replaced with black coloration. The purpose of this step is to avoid inadvertently selecting items in background and including those items in analysis.

FIG. 24C illustrate results of further processing. In FIG. 24C, vertical and horizontal convolution 3D Hi-Gauss filters followed by Morphological Open and Top-Hat filters have been applied. The purpose of the filtering is to increase contrast between adjacent kernels. Of course, other filtering techniques may be used.

FIG. 24D illustrate results of further processing. A morphological 3D Watershed filter was applied to yield the results shown. The purpose of such a filter is to separate kernels equally well at base and tip of ear. Of course, other filtering techniques may be used.

FIG. 24E illustrates the creation of a mask from Count/Size selection of black coloration that separates kernels. The purpose of such a step is to facilitate application or removal of lines separating kernels.

FIG. 24F illustrates results after further processing. There is an Undo of filters in original image followed by the application of a Convolution 3D low pass filter. The purpose of the step is to identify the spatial location, length and width of each ear for use in automatic area of interest (AOI) creation.

Figure 24G:
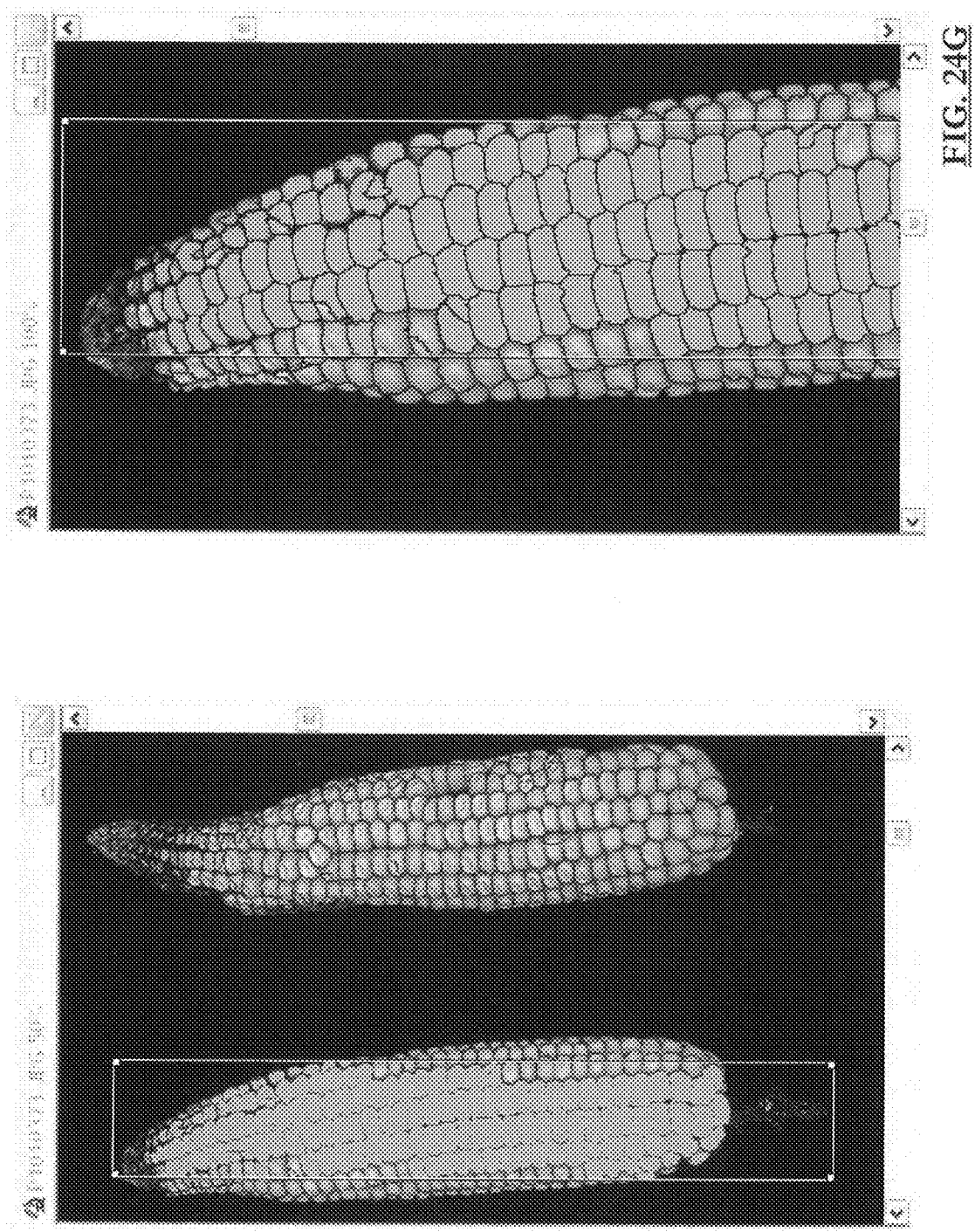

FIG. 24G illustrates results after further processing. There is an Image Operations application of Mask to image followed by automatic creation of AOI for each ear and loading of color palette for colors present in kernels. The purpose of such a step is to output data on per kernel area and dimensions to calculate KERARE, KERSHA and kernel distribution traits.

FIG. 24H illustrates results after further processing. There is automatic creation of AOI to include all ear and loading of color palette for colors present in kernels. The purpose of this step is to output kernel count for all kernels visible in image to calculate KEREAR.

Figure 24I:
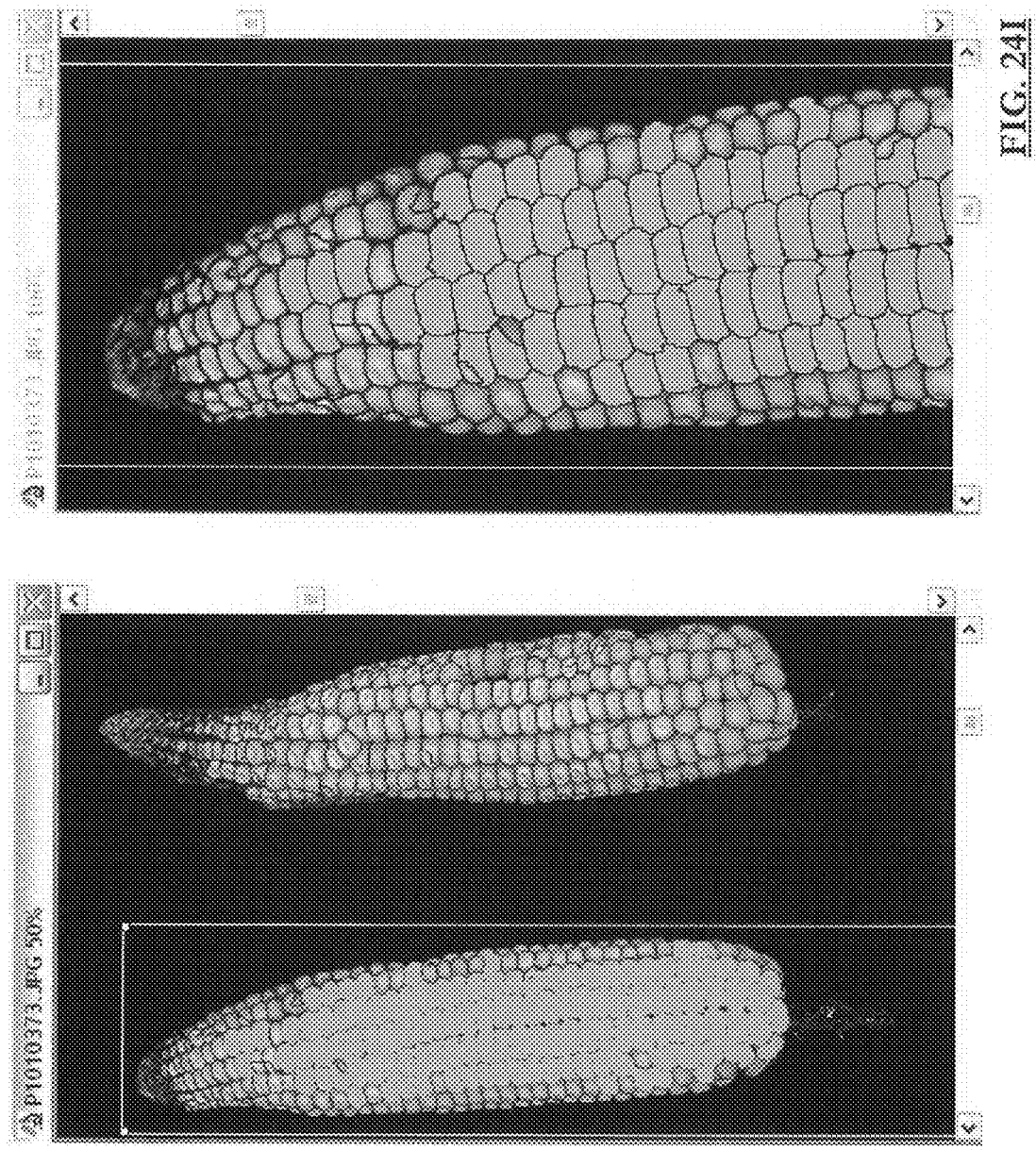

FIG. 24I illustrates results of further processing. Count/Size filtering on kernel area greater than 450 pixels (or other size) may be performed. The purpose of such a step is to locate division between filled and aborted kernels.

Figure 24J:
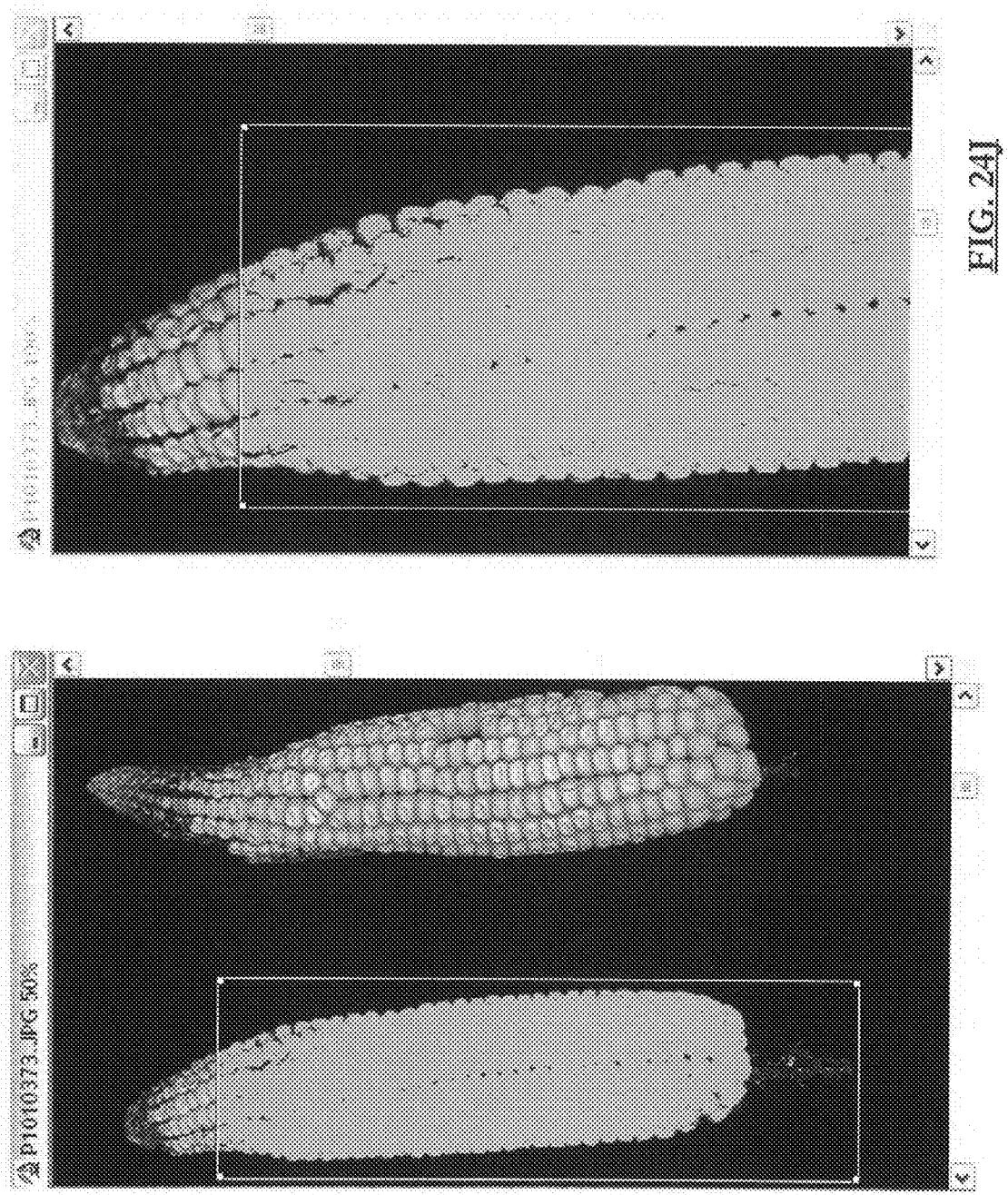

FIG. 24J illustrates results of further processing. An undo of mask application is followed by automatic creation of AOI with top set at the maximal y-axis location of filled kernels and selection of color palette of colors present in kernels. The purpose of such a step is to output area of ear section of filled kernels for use in calculation of SCTTER, KERFIL and YIELD.

FIG. 24K illustrates results of further processing. Selection of color palette of colors present in kernels and cob is performed. The purpose is to output length of ear section of filled kernels with cob and area of ear section of filled kernels with cob for use in calculation of TKERAB and SCTTER.

Figure 24L:
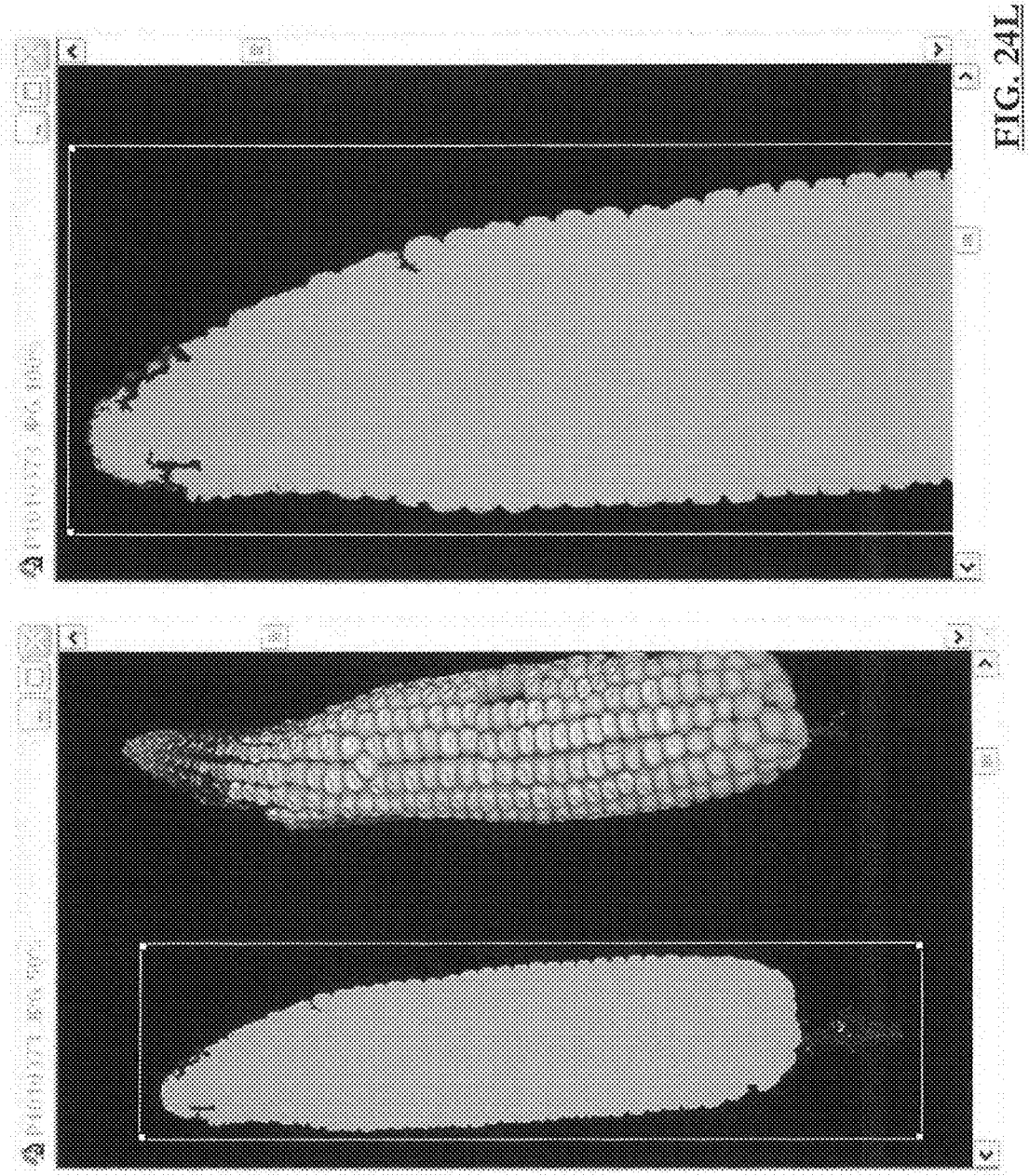

FIG. 24L illustrates results of further processing. Automatic creation of AOI including the whole ear and selection of color palette of colors present in kernels and cob is performed. The purpose of this step is to output length, dimensions and area of whole ear for use in calculation of EARLGT, KERFIL, TKERAB, and EARSHA.

Figure 25:
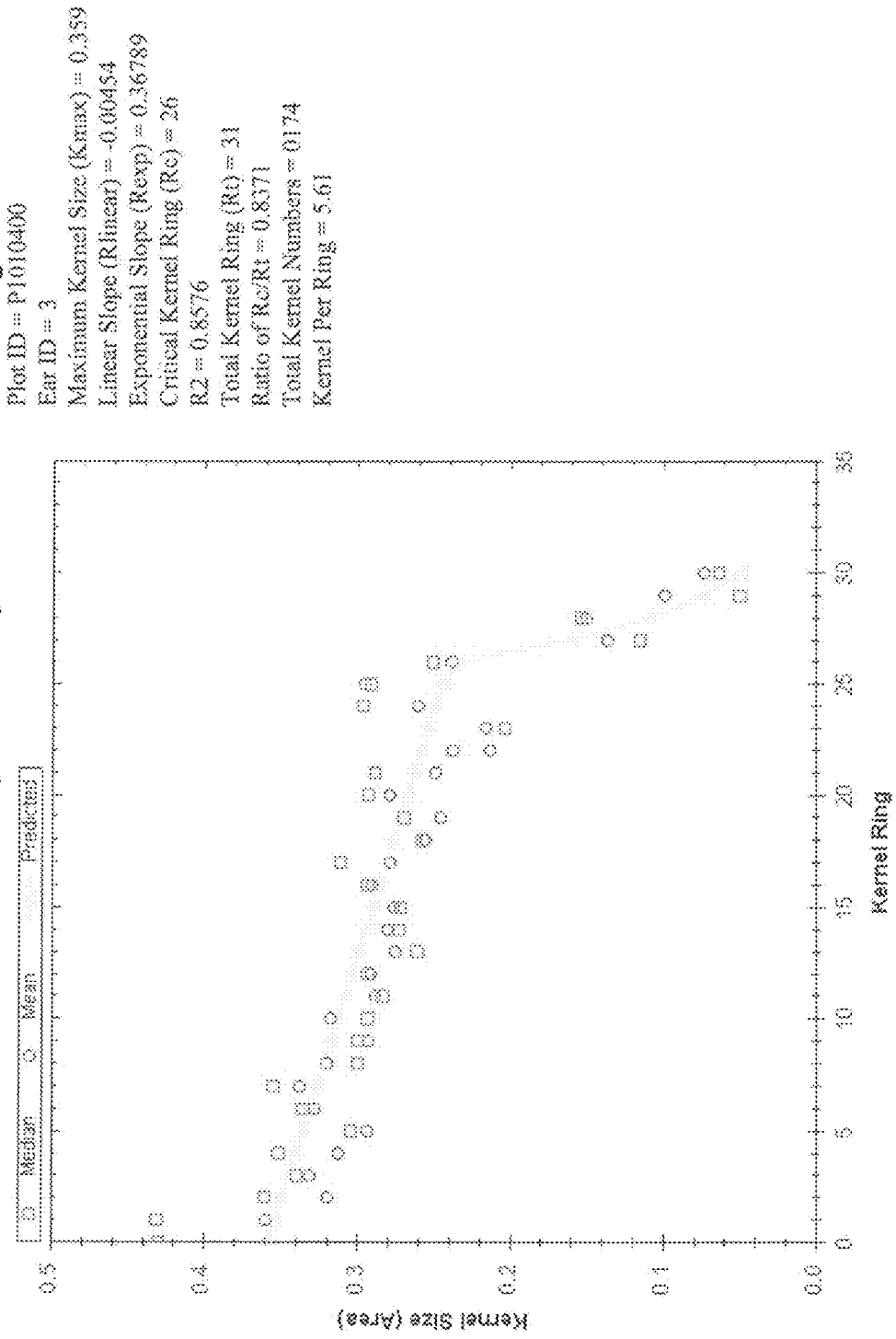
FIG. 25 is an illustration of post processing procedure for identifying critical kernel ring.

FIG. 25 illustrates an example of post-processing procedure for individual kernel area data. Kernels are assigned to rings (horizontal rows) and a broken stick model is fit to the distribution of median areas from the base of the ear to the tip. The break point is termed the critical kernel ring and the slopes before and after the break are output as the linear and exponential slopes, respectively.

Figure 26:
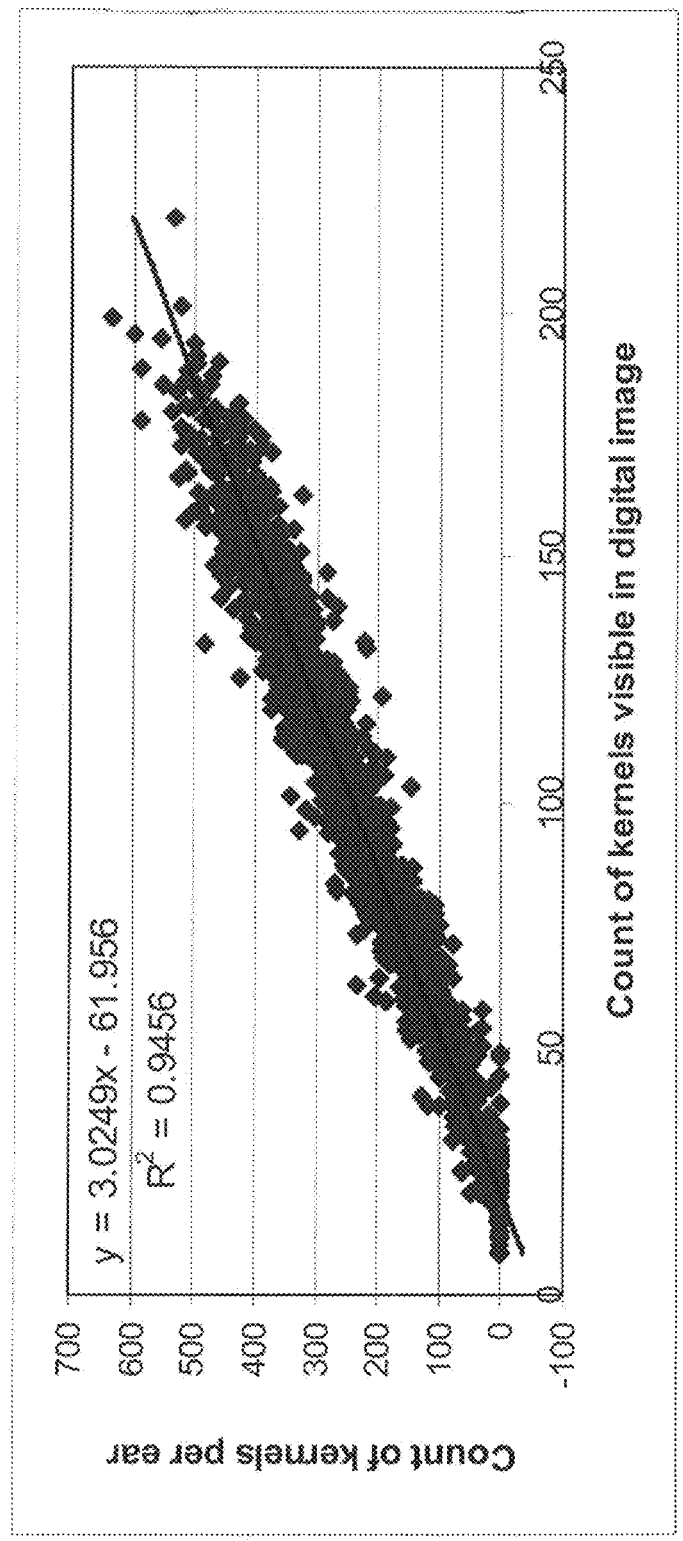
FIG. 26 is a graph of 1500 elite breeding lines grown under stress showing count of kernels visible in a digital image versus manual count of kernels per ear.

FIG. 26 is a plot for 1500 plots of elite breeding lines grown under flowering stress (plot averages of 5 ears). The plot shows the count of kernels visible in a digital image versus the count of kernels per ear manually determined and a calculated linear regression.

Figure 27:
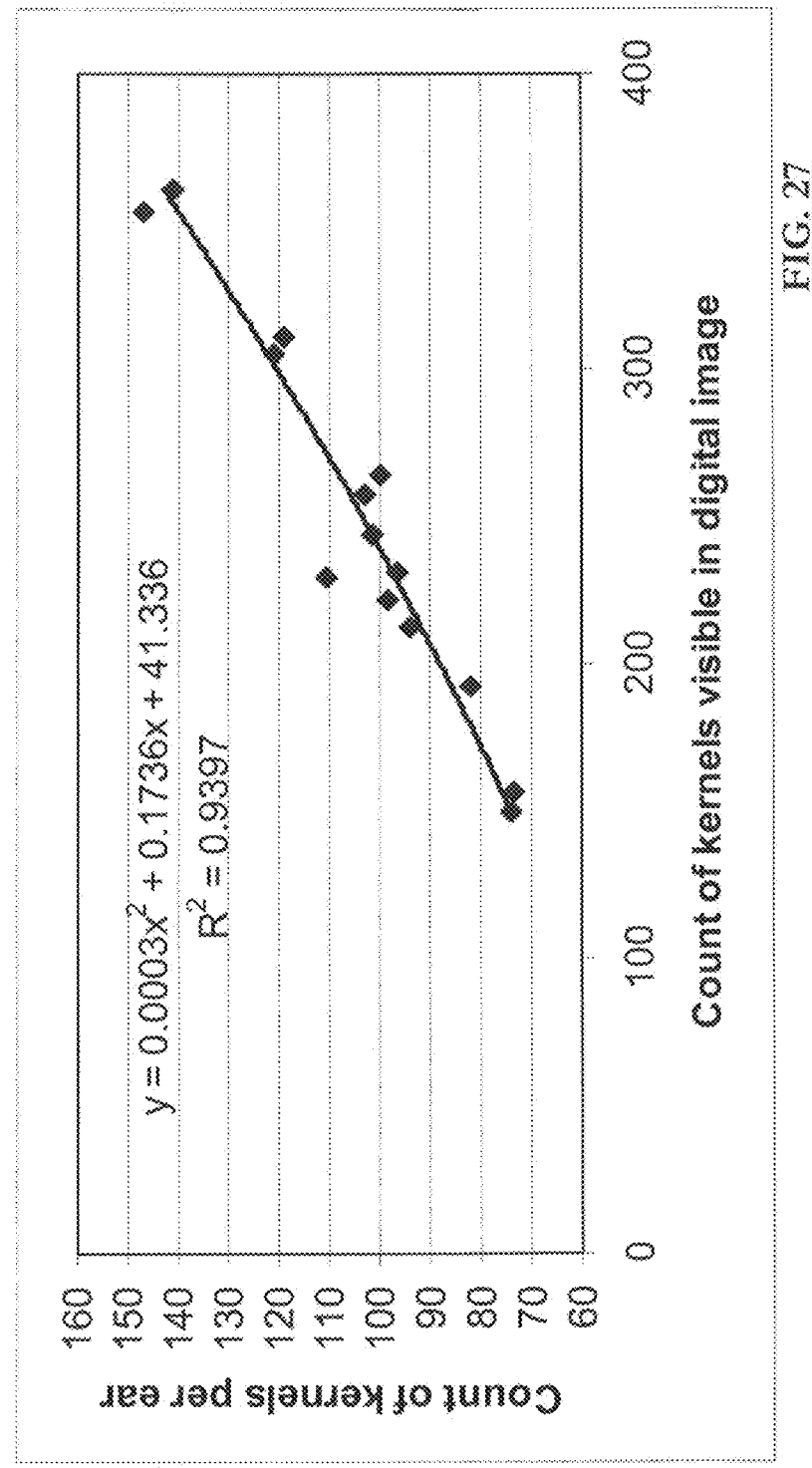
FIG. 27 is a graph of family averages of elite breeding lines grown under stress showing count of kernels visible in a digital image versus manual count of kernels per ear.

FIG. 27 is a plot showing family averages of elite breeding lines grown under stress. The plot shows the count of kernels visible in a digital image versus the count of kernels per ear manually determined and a calculated simple quadratic regression.

Figure 28:
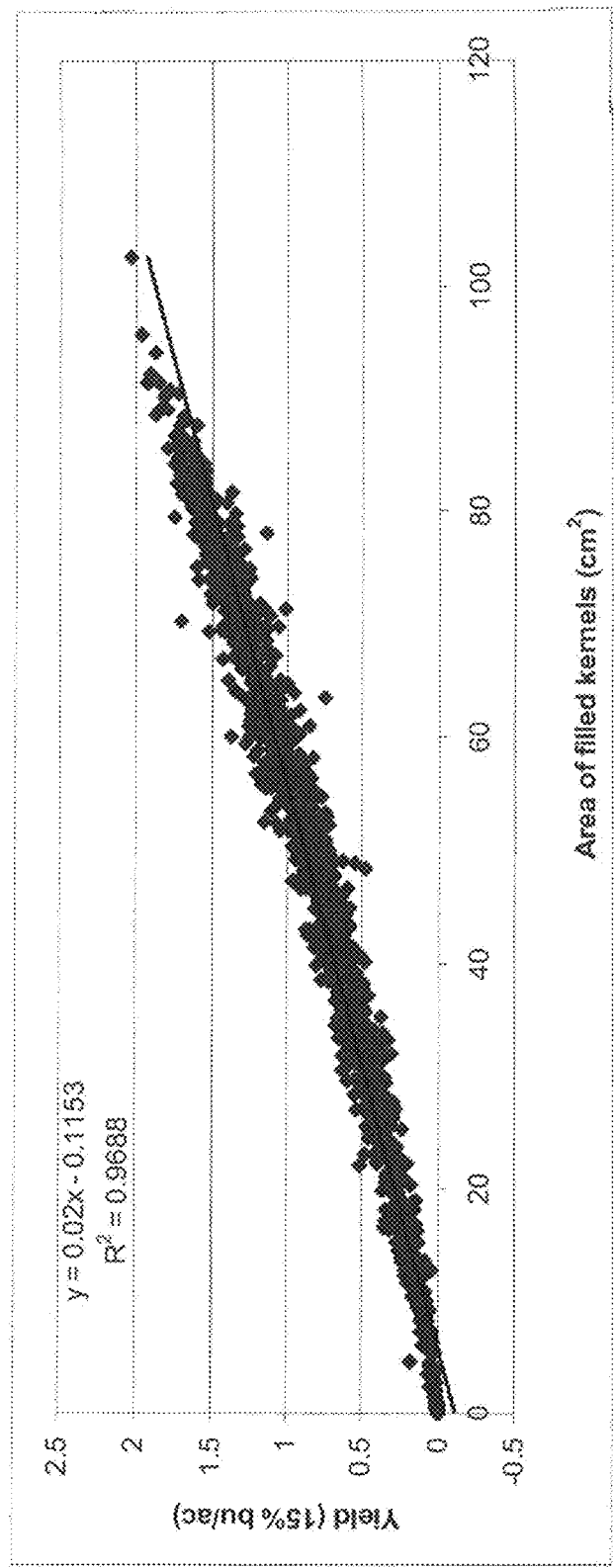
FIG. 28 is a graph of 1500 elite breeding lines grown under flowering stress showing area of filled kernels versus the yeild.

FIG. 28 is a plot for 1500 plots of elite breeding lines grown under stress (plot averages of 5 ears). The plot shows the area of filled kernels versus the yield as well as a calculated linear regression.

Figure 29:
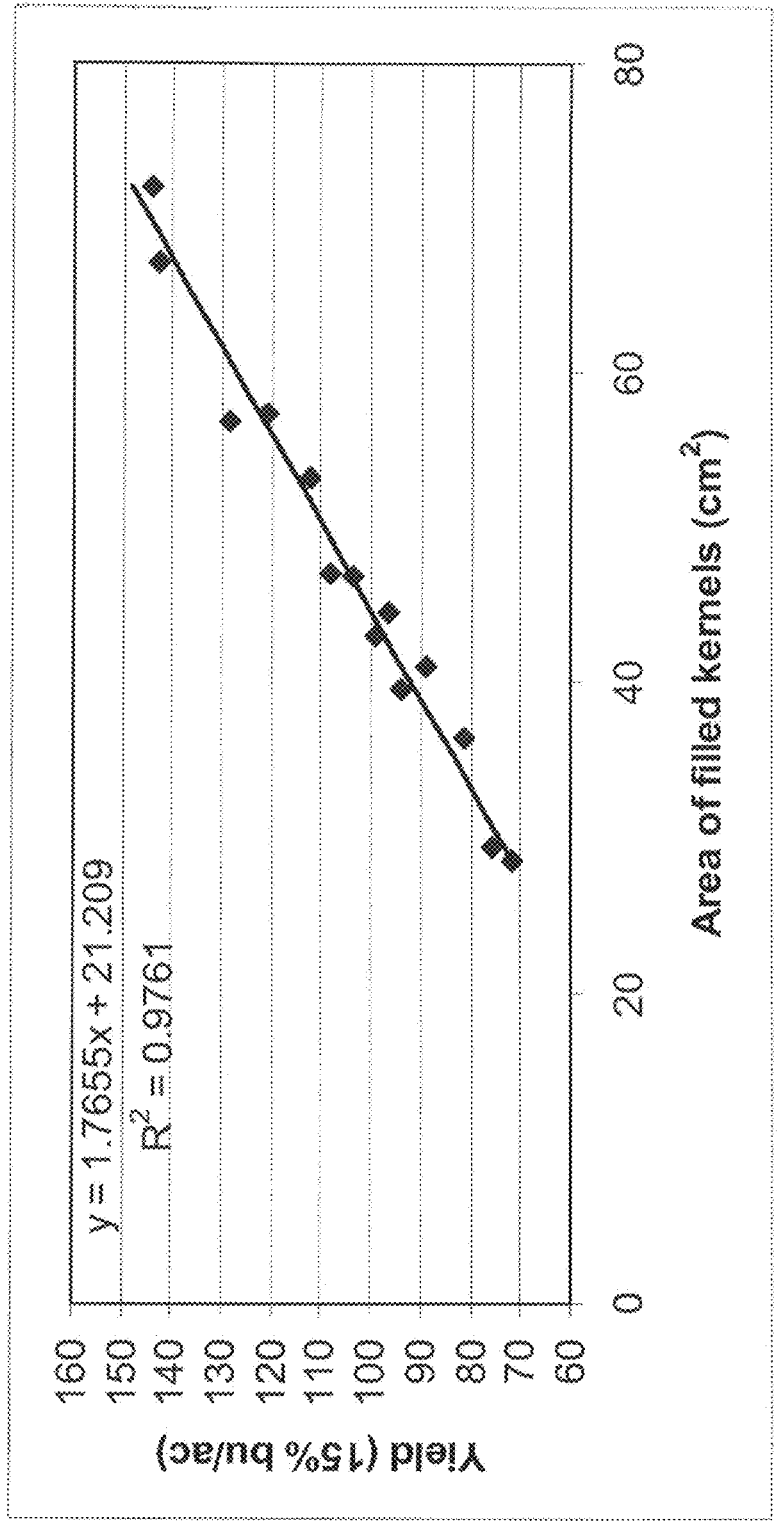
FIG. 29 is a graph of family averages of elite breeding lines grown under stress showing area of filled kernels versus the yeild.

FIG. 29 is a plot showing family averages of elite breeding lines grown under stress. The plot shows the area of filled kernels versus the yield as well as a calculated linear regression.

Figure 30:
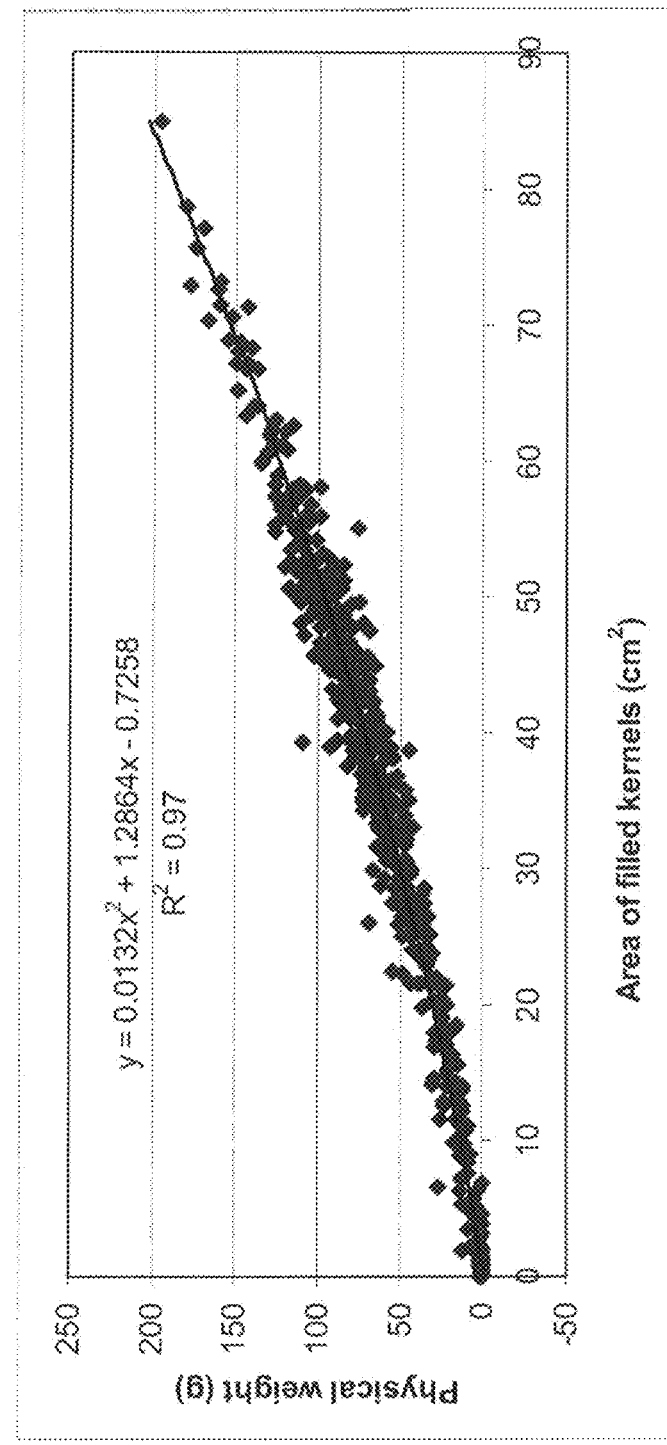
FIG. 30 is a graph of 630 commercial hybrids grown under stress showing area of filled kernels versus yeild.

FIG. 30 is a plot for 630 single ear measurements of commercial hybrids grown under stress. The plot shows the area of filled kernels versus the yield as well as a calculated simple quadratic regression.

Figure 31:
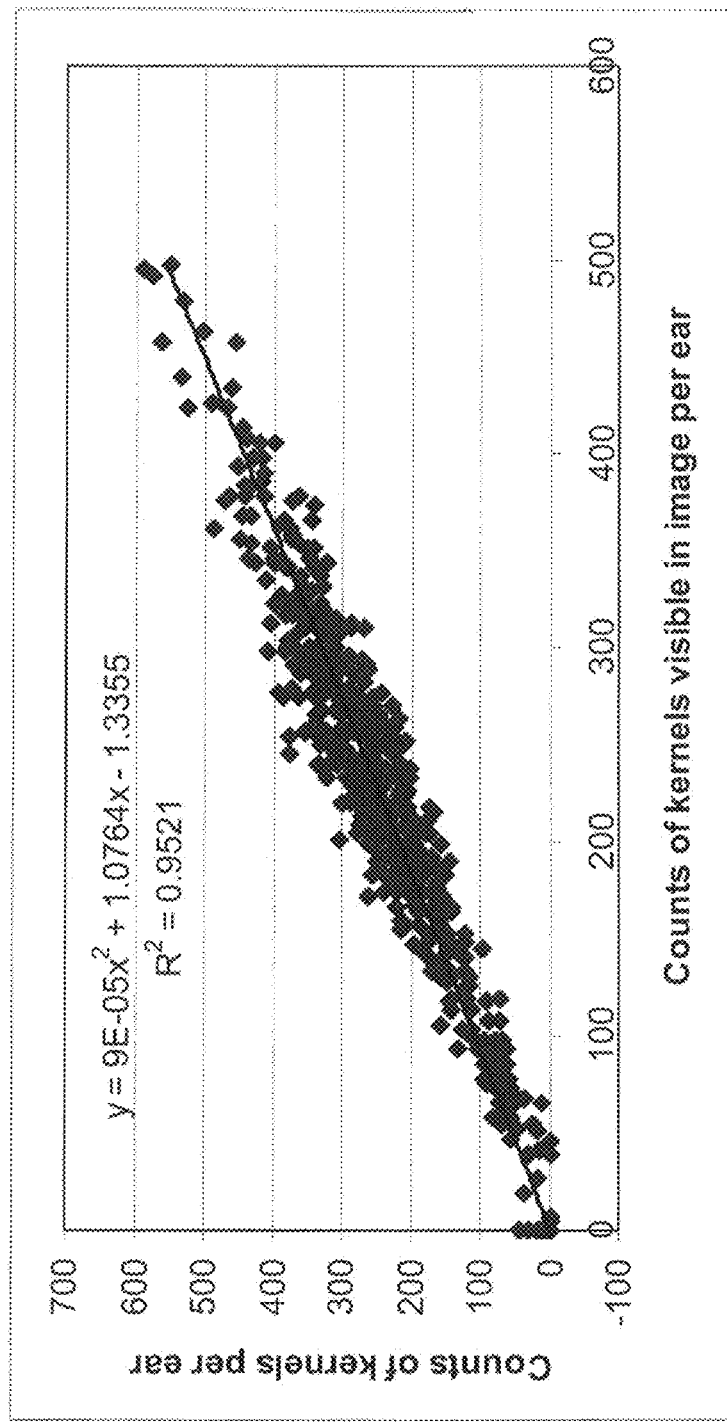
FIG. 31 is a graph of 630 commercial hybrids grown under stress showing count of kernels visible in a digital image versus manual count of kernels per ear.

FIG. 31 is a plot for 630 single ear measurements of commercial hybrids grown under stress. The plot shows the count of kernels visible in a digital image versus the count of kernels per ear manually determined and a calculated simple quadratic regression.

Figure 32:
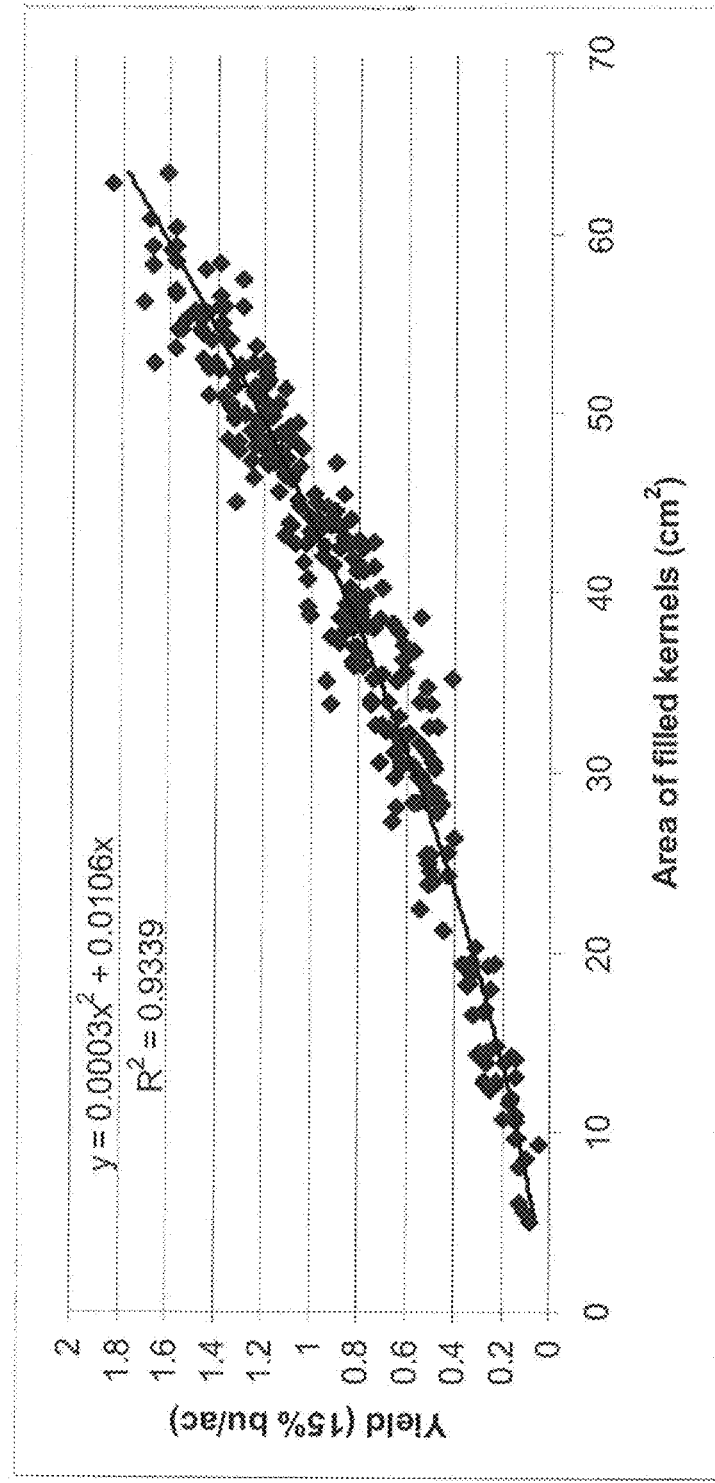
FIG. 32 is a graph of 287 plots of commercial hybrids grown under stress showing area of filled kernels versus yeild.

FIG. 32 is a plot for 287 plots of commercial hybrids grown in 3 watering treatments (plot averages of 10 ears). The plot shows the area of filled kernels versus the yield as well as a calculated simple quadratic regression.

Figure 33:
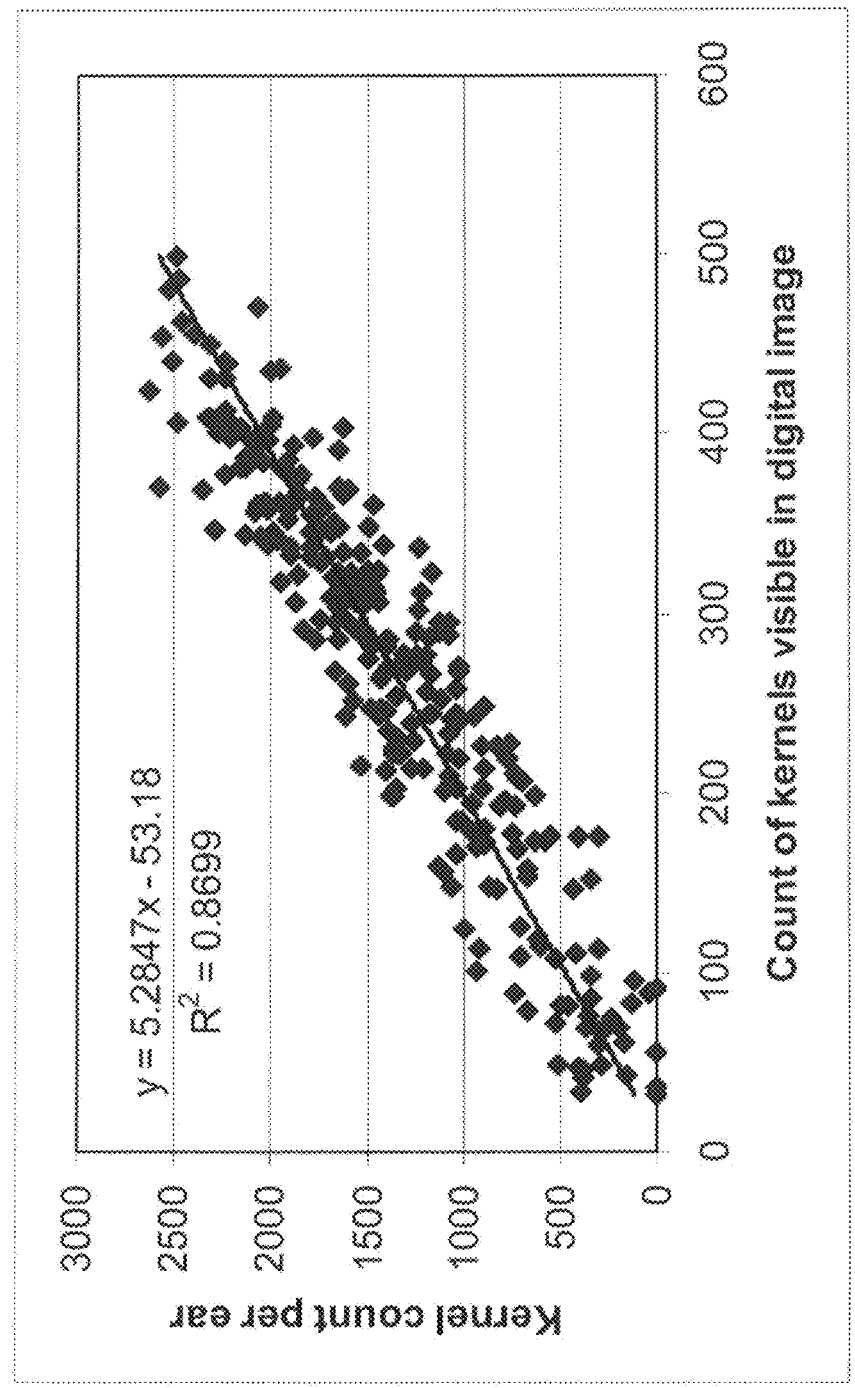
FIG. 33 is a graph of 287 plots of commercial hybrids grown under stress showing count of kernels visible in a digital image versus manual count of kernels per ear.

FIG. 33 is a plot for 287 plots of commercial hybrids grown in 3 watering treatments (plot averages of 10 ears). The plot shows the count of kernels visible in a digital image versus the count of kernels per ear manually determined and a calculated linear regression.

Figure 34:
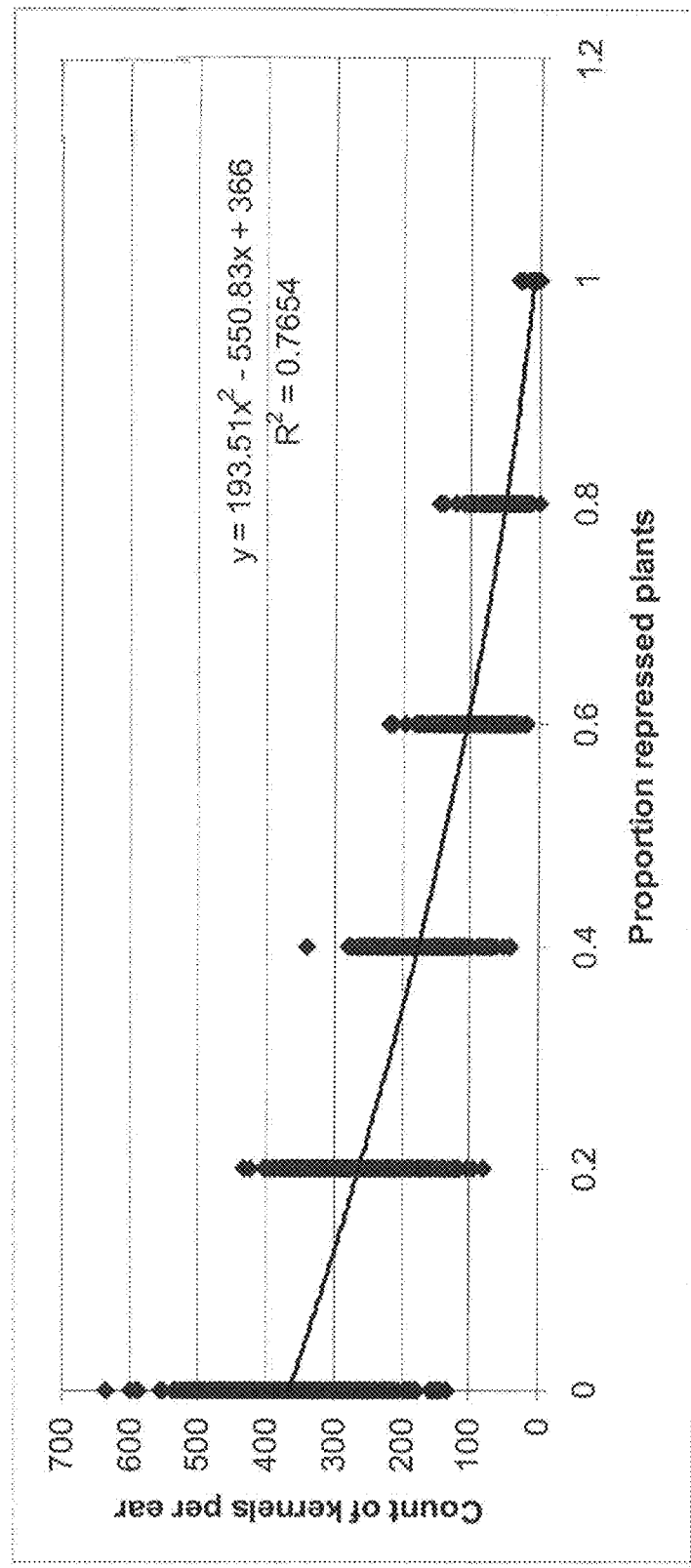
FIG. 34 is a graph of 1500 plots of elite breeding lines showing proportion of repressed plants versus the count of kernels per ear.

FIG. 34 is a plot for 1500 plots of elite breeding lines (plot averages of 5 ears). The plot shows the proportion of repressed plants versus the count of kernels per ear as well as a calculated simple quadratic regression.

Figure 35:
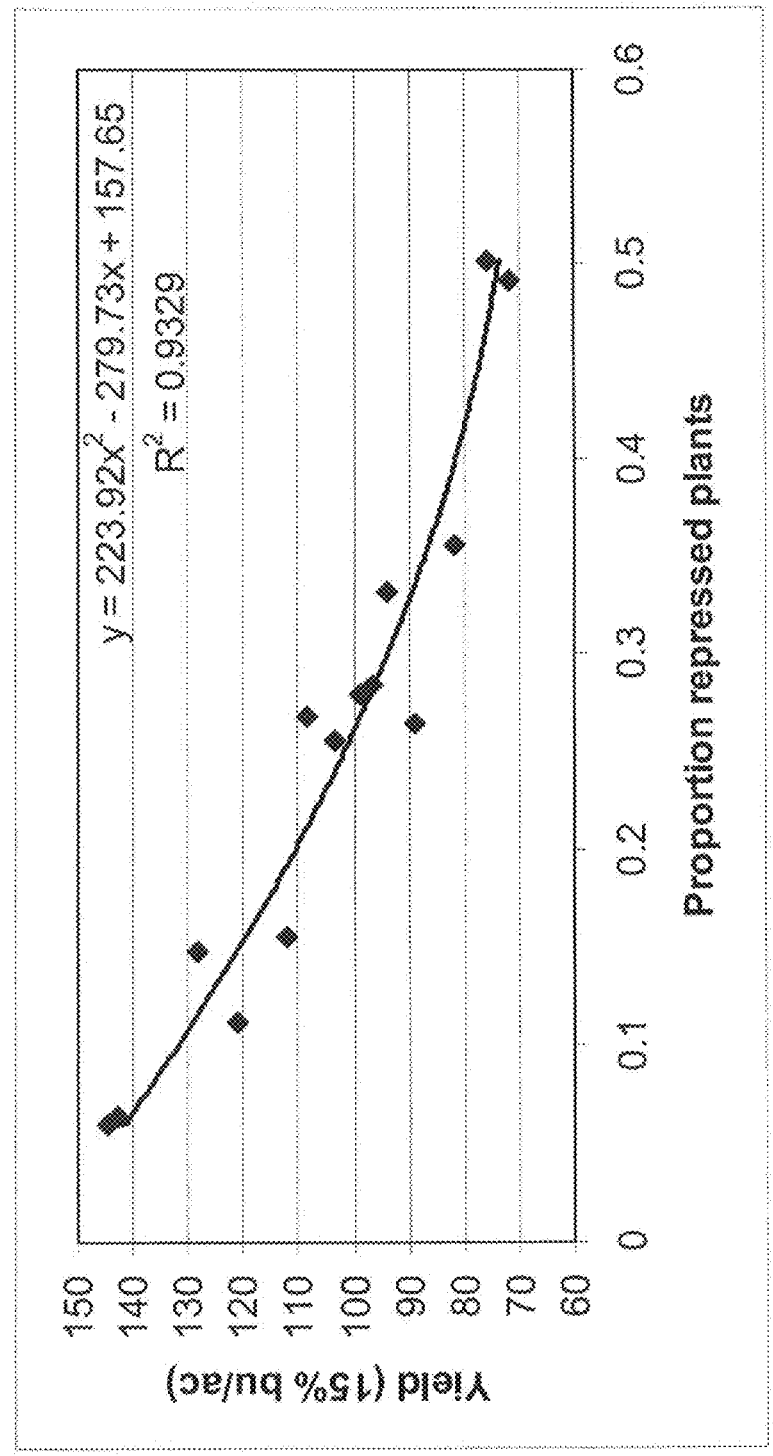
FIG. 35 is a graph showing family averages of elite breeding lines showing proportion of repressed plants versus the count of kernels per ear.

FIG. 35 is a plot showing family averages of elite breeding lines. The plot shows the proportion of repressed plants versus the count of kernels per ear as well as a calculated simple quadratic regression.

The plots shown in FIG. 24 to FIG. 35 and the relationships that may determined from the data presented in these plots (such as, but not limited to regressions) may be incorporated into breeding programs or used in other applications. Such applications, include, without limitation, studying of genetic variation on a plant-to-plant basis, quantifying plant-to-plant variability for stress tolerance, damage resulting from *Fusarium verticilliodes, Diplodia maydis, Ustilago maydis, Agrotis ipsilon, Blissus Leucopterus, Agramyza parvicorreis* and/or other diseases and/or insects, characterizing ear type for direct breeding (ear shape and size, kernel shape and size, kernel texture), clarifying within-ear carbon partitioning through grain size changes from base to tip of ear, quantifying tip-kernel abortion, nosing back, scattergrain or abnormal kernel set effects, measuring genotypic response to microenvironmental variation in the field (proxy for measurement of large scale genotype by environment effects), testing for the effects of introduced transgenes and/or genetic regions (quantitative trait loci), and determining the degree to which progeny of a cross are phenotypically similar to each parent. The digital imaging methods provide for quantitative measurements in a high throughput fashion so that relevant data may be collected for use in these and other applications, including breeding, production or evaluation programs.

What is claimed is:

1. A method of evaluating at least one kernel of maize on an ear using digital imagery, comprising steps of:
    acquiring, by a computing device, a digital image of the at least one kernel of maize on an ear, wherein the digital image is taken under controlled lighting conditions;
    processing, by the computing device, the digital image to determine an estimate of at least one physical property of the at least one kernel of maize from the digital image; and
    evaluating, by the computing device, the at least one kernel of maize using the estimate of the at least one physical property of the at least one kernel of maize.

2. The method of claim 1 wherein the physical property is filled kernel area.

3. The method of claim 1 wherein the physical property is kernel size.

4. The method of claim 1 wherein the physical property is kernel count on at least a portion of an ear of maize.

5. The method of claim 1 wherein the step of processing includes applying a spectral filter to the digital image.

6. The method of claim 1 wherein the step of evaluating includes comparing the at least one kernel of maize relative to other kernels of maize from a single plot.

7. The method of claim 1 wherein the at least one kernel of maize is from a first plot and the step of evaluating includes comparing the at least one kernel of maize relative to other kernels of maize from at least one additional plot.

8. A method of evaluating an ear of maize using digital imagery, comprising steps of:
    acquiring, by a computing device, a digital image of the ear of maize, wherein the digital image is taken under controlled lighting conditions;
    processing, by the computing device, the digital image to determine an estimate of at least one physical property of the ear of maize from the digital image;
    comparing, by the computing device, the estimate of at least one physical property of the ear of maize to estimates from other ears of maize to provide a comparison; and
    evaluating, by the computing device, the ear of maize relative to the other ears of maize based on the comparison.

9. The method of claim 8 wherein the physical property is filled kernel area.

10. The method of claim 8 wherein the physical property is kernel count.

11. The method of claim 8 wherein the step of processing includes applying a spectral filter to the digital image.

12. The method of claim 8 wherein the step of processing includes extracting a filled kernel area from the ear of maize using a predetermined color palette.

13. The method of claim 12 wherein the step of processing further comprises applying a filter to the digital image to enhance the center of each kernel of the ear of maize.

14. The method of claim 12 further comprising counting number of kernels on the ear of maize represented in the digital image to provide an estimate of at least one physical property.

15. The method of claim 8 wherein the step of evaluating includes comparing the ear of maize relative to the other ears of maize from a single plot.

16. The method of claim 8 wherein ear of maize is from a first plot and the step of evaluating includes comparing the ear of maize relative to the other ears of maize from at least one additional plot.

17. The method of claim 8 further comprising picking the ear of maize prior to the step of acquiring the digital image.

* * * * *